US012568569B2

(12) United States Patent
Bocock et al.

(10) Patent No.: US 12,568,569 B2
(45) Date of Patent: Mar. 3, 2026

(54) METHOD OF GENERATING A BUS VOLTAGE FOR POWERING LIGHTING DEVICES

(71) Applicant: Lutron Technology Company LLC, Coopersburg, PA (US)

(72) Inventors: Ryan M. Bocock, Austin, TX (US); Christopher M. Green, Austin, TX (US); Ananthanag Nemmani, Austin, TX (US); Jaykrishna A. Shukla, Mays Landing, NJ (US); David C. Wu, Malden, MA (US)

(73) Assignee: Lutron Technology Company LLC, Coopersburg, PA (US)

( * ) Notice: Subject to any disclaimer, the term of this patent is extended or adjusted under 35 U.S.C. 154(b) by 136 days.

(21) Appl. No.: 18/541,782

(22) Filed: Dec. 15, 2023

(65) Prior Publication Data

US 2024/0206042 A1 Jun. 20, 2024

Related U.S. Application Data

(60) Provisional application No. 63/433,115, filed on Dec. 16, 2022.

(51) Int. Cl.
*H05B 47/185* (2020.01)

(52) U.S. Cl.
CPC .................................. *H05B 47/185* (2020.01)

(58) Field of Classification Search
CPC ....... H05B 47/185; H05B 47/18; H05B 45/14
See application file for complete search history.

(56) References Cited

U.S. PATENT DOCUMENTS

| | | | |
|---|---|---|---|
| 8,049,432 | B2 | 11/2011 | Taipale et al. |
| 8,492,987 | B2 | 7/2013 | Nuhfer et al. |
| 8,680,787 | B2 | 3/2014 | Veskovic |
| 9,954,435 | B2 | 4/2018 | Knauss et al. |
| 10,368,423 | B2 | 7/2019 | Sturm et al. |
| 11,570,874 | B2 | 1/2023 | Bocock et al. |

(Continued)

FOREIGN PATENT DOCUMENTS

CN 116471720 B 1/2024

OTHER PUBLICATIONS

CN116471720, Cited in PCT Search Report, dated Apr. 24, 2024, in related PCT Application No. PCT/US23/84318. English translation of Abstract, Claims, and Description provided by Espacenet.com.

*Primary Examiner* — Minh Tran
(74) *Attorney, Agent, or Firm* — Flaster Greenberg P.C.

(57) ABSTRACT

A system may include a plurality of master lighting modules and a fixture controller. The fixture control may include a power converter circuit that is configured to generate a bus voltage on a power bus. The plurality of master lighting modules may be serially-coupled on the power bus. The fixture controller may include a control circuit that is configured to receive an indication of a magnitude of an end bus voltage at an end master lighting module. The end master lighting module may be the master lighting module that is located furthest from the fixture controller along the power bus. The control circuit may be configured to generate a target bus voltage control signal based on the magnitude of the end bus voltage. The power converter circuit may be configured to control a magnitude of the bus voltage based on the target bus voltage control signal.

20 Claims, 12 Drawing Sheets

(56) References Cited

U.S. PATENT DOCUMENTS

| | | | | |
|---|---|---|---|---|
| 11,859,803 | B2 | 1/2024 | Bocock et al. | |
| 2012/0043899 | A1 * | 2/2012 | Veskovic | H05B 41/295<br>315/200 R |
| 2022/0039243 | A1 * | 2/2022 | Bocock | H05B 45/10 |

* cited by examiner

METHOD OF GENERATING A BUS VOLTAGE FOR POWERING LIGHTING DEVICES

CROSS-REFERENCE TO RELATED APPLICATIONS

This application claims the benefit of Provisional U.S. Patent Application No. 63/433,115, filed Dec. 16, 2022, the entire disclosure of which is hereby incorporated by reference herein in its entirety.

BACKGROUND

Lamps and displays using efficient light sources, such as light-emitting diode (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

A multi-colored LED illumination device may have two or more different colors of LED emission devices (e.g., LED emitters) that are combined within the same package to produce light (e.g., white or near-white light). There are many different types of white light LED light sources on the market, some of which combine red, green, and blue (RGB) LED emitters; red, green, blue, and yellow (RGBY) LED emitters; phosphor-converted white and red (WR) LED emitters; red, green, blue, and white (RGBW) LED emitters, etc. By combining different colors of LED emitters within the same package, and driving the differently-colored emitters with different drive currents, these multi-colored LED illumination devices may generate white or near-white light within a wide gamut of color points or correlated color temperatures (CCTs) ranging from warm white (e.g., approximately 2600K-3700K), to neutral white (e.g., approximately 3700K-5000K) to cool white (e.g., approximately 5000K-8300K). Some multi-colored LED illumination devices also may enable the brightness (e.g., intensity level or dimming level) and/or color of the illumination to be changed to a particular set point.

SUMMARY

A fixture controller and system that includes a fixture controller are described herein. The system may include a fixture controller and one or more lighting devices. Each lighting device may include one or more master lighting modules and one or more drone lighting modules. Each lighting device may be configured to adjust a present intensity level of light emitted by the lighting device between a low-end intensity level and a high-end intensity level. The fixture controller may include a power converter circuit that is configured to generate a bus voltage on a power bus. The power bus may be coupled between the fixture controller and the plurality of lighting devices. The plurality of lighting devices may be serially-coupled on the power bus.

The fixture controller may include a control circuit that is configured to control the one or more lighting devices. The control circuit may be configured to receive an indication of an end bus voltage magnitude of the bus voltage as received by an end lighting device of the plurality of lighting devices, and generate a target bus voltage control signal based on the magnitude of the end bus voltage. The end lighting device may be the lighting device of the plurality of lighting devices that is located furthest from the fixture controller along the power bus. For instance, the end lighting device may be lighting device of the plurality of lighting devices that has the longest amount of power bus wiring between the fixture controller and the lighting device. The target bus voltage control signal may indicate a target bus voltage magnitude for the power converter circuit. The power converter circuit may be configured to control a magnitude of the bus voltage towards the target bus voltage magnitude based on the target bus voltage control signal.

In some examples, the control circuit may be configured to send a request to the end lighting device, wherein the request prompts the end lighting device to send the indication of the magnitude of the end bus voltage. The target bus voltage magnitude may range from a minimum target bus voltage magnitude to a maximum target bus voltage magnitude. The control circuit may be configured to determine that the end bus voltage magnitude drops below a pre-brownout threshold, and generate the target bus voltage control signal to control the target bus voltage magnitude to be equal to the maximum target bus voltage magnitude in response to the determination that the end bus voltage magnitude has dropped below the pre-brownout threshold. For example, the control circuit may be configured to generate the target bus voltage control signal to control the target bus voltage magnitude to be equal to the maximum target bus voltage magnitude for a predetermined period of time, and at the expiration of the predetermined period of time, may be configured to generate the target bus voltage control signal based on the end bus voltage magnitude. In some examples, at the expiration of the predetermined period of time, the control circuit may be configured to generate the target bus voltage control signal at a value that is less than the maximum value. The magnitude of the pre-brownout threshold may be below the minimum target bus voltage magnitude. In some examples, the minimum target bus voltage magnitude may be approximately 17 volts and the maximum target bus voltage magnitude may be approximately 21 volts.

The control circuit may be configured to control the magnitude of the target bus voltage control signal to control the end bus voltage magnitude towards a target end bus voltage magnitude. For example, the control circuit may be configured to generate the target bus voltage control signal based on the end bus voltage magnitude and the target end bus voltage magnitude. The target end bus voltage magnitude may be 17 volts. In some examples, the control circuit may be configured to generate the target bus voltage control signal based on the end bus voltage magnitude and the target end bus voltage magnitude using a digital proportional-integral (PI) controller of the control circuit. For instance, the control circuit may include the digital PI controller, and the PI controller may be configured to generate an error value based on the end bus voltage magnitude and the target end bus voltage magnitude, and generate the target bus voltage control signal based on error value.

The control circuit is configured to generate the target bus voltage control signal to cause the power converter circuit to generate the bus voltage at a magnitude across a range between a minimum bus voltage and a maximum bus voltage. The target end bus voltage magnitude may be equal to the minimum bus voltage.

The control circuit of the fixture controller may be configured to transmit one or more messages to the master lighting modules via a master communication bus, and the master lighting modules of each lighting device may be configured to relay the messages to the one or more drone lighting modules of the lighting device. The control circuit of the fixture controller may be configured to receive the indication of the end bus voltage magnitude at an end master lighting module of the end lighting device. The end master lighting module is located furthest from the fixture controller along the power bus. For instance, the end master lighting module may be the master lighting module of the plurality of master lighting modules that has the longest amount of power bus wiring between the fixture controller and the master lighting module.

As described herein a lighting device may include a plurality of controllable light-emitting diode (LED) light sources. A lighting device may include an elongated housing, a plurality of lighting modules, and a plurality of emitter modules. The elongated housing may define a cavity. The cavity may extend along a longitudinal axis of the housing. The plurality of lighting modules may be configured to be received within the cavity of the housing. Each of the plurality of lighting modules may include a plurality of emitter modules mounted thereto. Each of the plurality of lighting modules may include a drive circuit configured to receive a bus voltage on a power bus for powering the plurality of emitter printed circuit boards. Each of the plurality of lighting modules may include a control circuit configured to control the plurality of emitter modules mounted to the respective lighting module based on receipt of one or more messages. The one or more messages may include control instructions. For example, the control circuit may control an intensity level of the emitter modules mounted to a printed circuit board of the respective lighting module. The drive circuit and/or control circuit may be mounted to the printed circuit board of the lighting modules.

DETAILED DESCRIPTION

Figure 1:
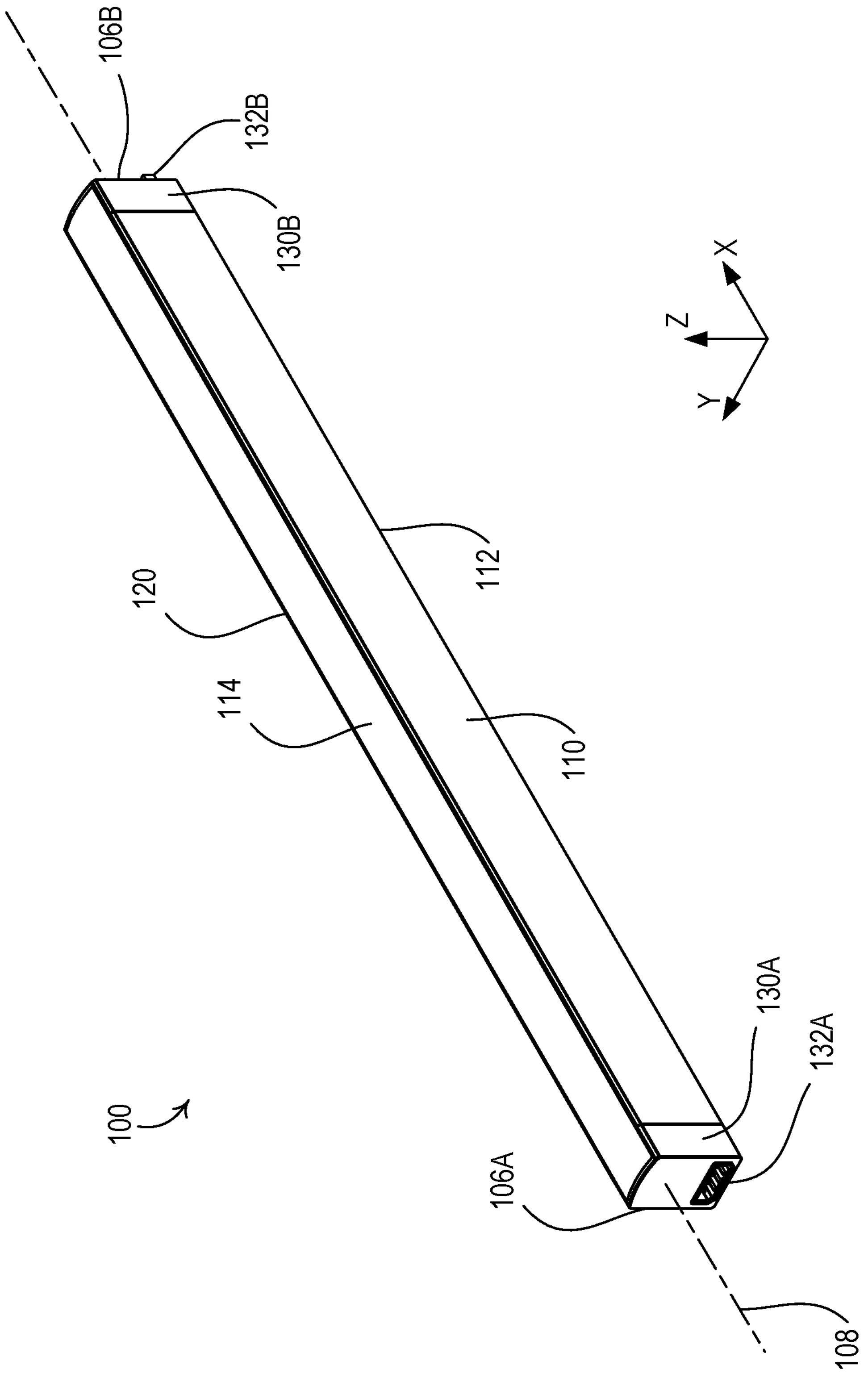
FIG. 1 is a simplified perspective view of an example lighting device (e.g., a linear lighting fixture).

FIG. 1 is a simplified perspective view of an example lighting device 100, (e.g., a linear lighting fixture). The lighting device 100 may include a housing 110, a cover lens 120, and end caps 130A, 130B. The housing 110 may be elongate (e.g., in the x-direction). The housing 110 may be configured to be mounted to a structure (e.g., a horizontal structure) such that the linear lighting device is attached to the structure. For example, the lighting device 100 may be configured to be mounted underneath a cabinet, a shelf, a door, a step, and/or some other structure. The housing 110 may define an upper surface 112 and a lower surface 114. The upper surface 112 may be configured to be proximate to the structure and the lower surface 114 may be distal to the structure when the housing 110 is mounted to the structure.

The lighting device 100 may define a first end 106A (e.g., an input end) and an opposed second end 106B (e.g., an output end). The end cap 130A may be an input end cap located at the first end 106A and the end cap 130B may be an output end cap located at the second end 106B. The lighting device 100 may define connectors 132A, 132B that are accessible via the respective end caps 130A, 130B. The connectors 132A, 132B may be configured to connect the lighting device 100 to a fixture controller (e.g., a controller, a lighting controller and/or a fixture controller such as the fixture controller 520 shown in FIG. 6) and/or other lighting devices. For example, the connector 132A may be configured to connect the lighting device 100 to the controller or another lighting device and the connector 132B may be configured to connect the lighting device 100 to another lighting device.

Figure 2:
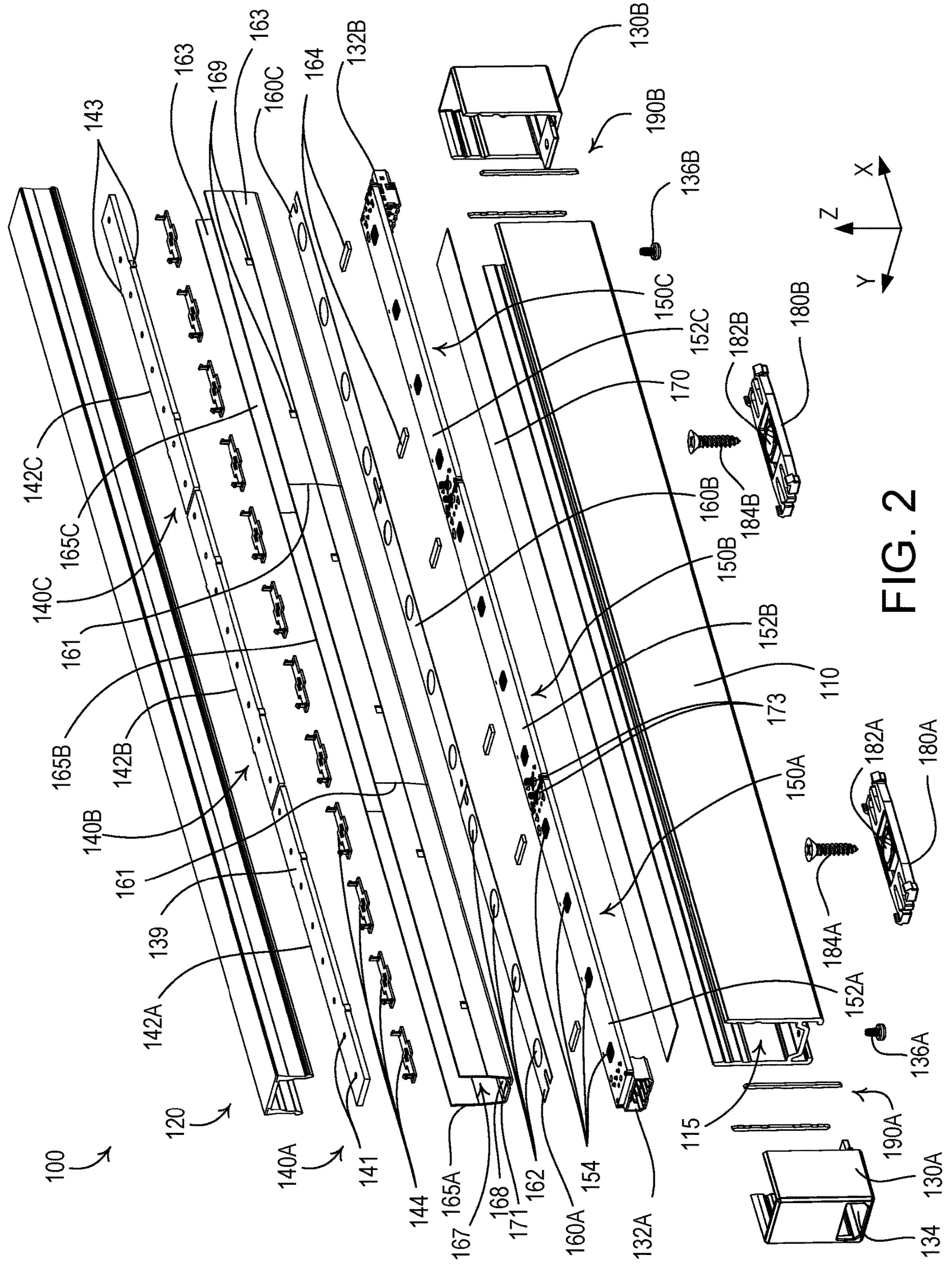
FIG. 2 is a partially exploded view of the lighting device of FIG. 1.

FIG. 2 is an exploded view of the example linear lighting device 100. The housing 110 may define a cavity 115 extending along a longitudinal axis 108 (e.g., in the x-direction) of the linear lighting device 100 (e.g., the housing 110). The longitudinal axis 108 may be defined by a length of the housing 110. The housing 110 may define an inner surface 112, for example, that defines the boundaries of the cavity 115. The inner surface 112 may define channels 114 on opposed sides of the cavity 115 that extend (e.g., in the x-direction) along a length of the linear lighting device 100. The cover lens 120 may define sidewalls 122 that are configured to extend into the cavity 115 to secure the cover lens 120 to the housing 110. The sidewalls 122 may define ridges 124 that are configured to engage (e.g., be received within) the channels 114 to secure the cover lens 120 to the housing 110.

The linear lighting device 100 may comprise one or more lighting modules (e.g., light-generation modules) 150A, 150B, 150C that may be received within the cavity 115. The lighting modules 150A, 150B, 150C may each comprise a respective printed circuit board (PCB). The lighting modules 150A, 150B, 150C may each comprise one or more emitter modules 154 (e.g., emitter assemblies), which may each include one or more emitters, such as light-emitting diodes (LEDs). In this example, each lighting module 150A, 150B, 150C includes four respective emitter modules 154. The emitter modules 154 may be mounted to the respective PCBs 152A, 152B, 152C. Each of the lighting module 150A, 150B, 150C may include an emitter processor configured to control the emitter modules 154 mounted to the PCB 152A, 152B, 152C of the respective lighting module 150A, 150B, 150C. When the lighting modules 150A, 150B, 150C include a plurality of emitter modules 154, each of the plurality of emitter modules 154 of a respective lighting module (e.g., lighting module 150A) may be controlled by one emitter processor. Controlling multiple emitter modules 154 with one emitter processor may reduce the power consumption of the lighting module, reduce a size of the PCB, and/or reduce a number of messages sent.

The lighting modules 150A, 150B, 150C (e.g., the PCBs 152A, 152B, 152C) may be secured within the cavity 115, for example, using thermal tape 170. The thermal tape 170 may be an adhesive that enables heat dissipation from the emitter modules 154 of the PCBs 152A, 152B, 152C to the housing 110, for example, while also affixing the PCBs 152A, 152B, 152C to the housing 110. The thermal tape 170 may be separated into segments (e.g., two or more) for each of the PCBs 152A, 152B, 152C. Alternatively, it should be appreciated that the thermal tape 170 may be continuous along the length (e.g., in the x-direction) of the linear lighting device 100.

The PCBs 152A, 152B, 152C of the lighting modules 150A, 150B, 150C may be connected together using cables, such as ribbon cables (not shown). The cables may mechanically, electrically, and/or communicatively connect adjacent PCBs of the PCBs 152A, 152B, 152C. For example, the PCB 152A may be connected to the PCB 152B via one of the cables and the PCB 152B may be connected to the PCB 152C via another one of the cables. For example, the ends of the cables may be inserted into sockets, such as zero-insertion force (ZIF) connectors, on PCBs of the adjacent lighting modules. The cables may be flat flexible cable jumpers, as shown. Alternatively, the cables may be round flexible jumpers, rigid jumpers, and/or the like.

The lighting module 150A may be a master module (e.g., a starter module). For example, the master module may be a first module of the linear lighting device 100 that is located proximate to the first end 106A. For example, each linear lighting device 100 may start with a master module (e.g., such as the lighting module 150A). A master module may receive messages (e.g., including control data and/or commands) and may be configured to control one or more other lighting modules, for example, drone lighting modules, based on receipt of the messages. For example, each master module may include an additional processor (e.g., a master processor 158). The lighting modules 150B, 150C may be drone lighting modules. Each drone lighting module may be controlled by a master module. For example, the lighting modules 150B, 150C may be controlled by the lighting module 150A. The master processor of the lighting module 150A may control the emitter processors to control the emitter modules 154 of each of the lighting modules 150A, 150B, 150C. Drone lighting modules may be either a middle drone lighting module or an end drone module. Middle drone lighting modules (e.g., such as the emitter module 150B) may be connected between a master module and another drone lighting module. Middle drone lighting modules may be connected between other drone lighting modules. End drone lighting modules (e.g., such as the lighting module 150C) may be connected between a master module or another drone lighting module of its respective linear lighting device and another linear lighting device. End drone lighting modules may be connected between another drone lighting module and another master module (e.g., when the linear lighting device 100 includes multiple master modules). Although the linear lighting device 100 is shown having three lighting modules, for example, a master module 150A, a middle drone lighting module 150B, and an end drone lighting module 150C, it should be appreciated that a linear lighting device may include a plurality of master modules. Each master module may control a plurality (e.g., one or more) of drone lighting modules (e.g., up to five drone lighting modules).

Each master module (e.g., the lighting module 150A) of the linear lighting device 100 may include a connector 132A (e.g., an input connector) attached thereto. For example, the connector 132A may be a female connector. The connector 132A may be configured to enable connection of the linear lighting device 100 to a fixture controller (e.g., a controller and/or a fixture controller, such as fixture controller 520 shown in FIG. 6). The connector 132A may be configured to enable connection of the linear lighting device 100 to another linear lighting device. The connector 132A may be configured to enable connection of the master module (e.g., the lighting module 150A) of the linear lighting device 100 to a drone lighting module (e.g., an end drone lighting module) of another linear lighting device. Each end drone lighting module (e.g., the lighting module 150C) of the linear lighting device 100 may include a connector 132B (e.g., an output connector) attached thereto. For example, the connector 132B may be a male connector. The connector 132B may be configured to enable connection of the linear lighting device 100 to another linear lighting device. The connector 132B may be configured to enable connection of the end drone lighting module (e.g., the lighting module 150C) of the linear lighting device 100 to a master module of another linear lighting device.

The linear lighting device 100 may comprise end caps 130A, 130B. The end caps 130A, 130B may define apertures 134 that are configured to receive the connector 132A and/or the connector 132B. The end caps 130A, 130B may be secured to the housing 110, for example, using fasteners 136A, 136B. Light gaskets 190A, 190B may be configured to prevent light emitted by the emitter PCBs 150A, 150B, 150C from escaping between the end caps 130A, 130B and the housing 110. The light gasket 190A may be configured to be located between the end cap 130A and the housing 110. The light gasket 190B may be configured to be located between the end cap 130B and the housing 110.

The linear lighting device 100 may comprise one or more reflectors 165A, 165B, 165C. The reflectors 165A, 165B, 165C may be configured to reflect (e.g., direct) the light generated by the emitter modules 154, for example, toward the cover lens 120. For example, the reflectors 165A, 165B, 165C may define a reflective upper surface. Each of the reflectors 165A, 165B, 165C may be configured such that the light emitted by the emitter modules 154 is ultimately redirected through the cover lens 120. Each of the reflectors 165A, 165B, 165C may be aligned with a corresponding one of the PCBs 152A, 152B, 152C. For example, reflector 165A may be mounted above and aligned with PCB 152A, reflector 165B may be mounted above and aligned with PCB 152B, and reflector 165C may be mounted above and aligned with PCB 152C. For example, the ends of the reflectors 165A, 165B, 165C may be aligned with the ends of the PCBs 152A, 152B, 152C. Each of the reflectors 165A, 165B, 165C may define a base portion 168 (e.g., base plate) and sidewalls 163 extending from the base portion 168. The sidewalls 163 may be configured to extend beyond a mid-point (e.g., in the z-direction) of the housing 110. Each of the reflectors 165A, 165B, 165C may define a cavity 167 that is optical structures defined by the base portion 168 and the sidewalls 163.

Each of the reflectors 165A, 165B, 165C (e.g., the base portion 168) may define a plurality of openings 166 that are configured to be aligned with a corresponding one of the emitter modules 154 such that the light generated by the emitter modules 154 passes through the openings 166. The emitter modules 154 may be configured to extend (e.g., partially extend) through the openings 166 into the cavity 167 defined by the reflectors 165A, 165B, 165C. Each of the reflectors 165A, 165B, 165C may define slots 171 at opposed ends that are configured to receive mounting studs 173 on each of the PCBs 152A, 152B, 152C. Although the figures only show the slots 171 at one end of the reflector 165A, it should be appreciated that each of the reflectors 165A, 165B, 165C define slots 171 on both ends. For example, the reflectors 165A, 165B, 165C may be symmetrical in the x-direction. The mounting studs 173 may be configured to be soldered to the reflectors 165A, 165B, 165C, for example, to secure the reflectors 165A, 165B, 165C to the PCBs 152A, 152B, 152C and to electrically connect the reflectors 165A, 165B, 165C to ground (e.g., which may aide in preventing electrostatic discharges from reaching and damaging the electrical components on the respective PCBs 152A, 152B, 152C). Although the figures show a mounting stud 173 at one end of the PCBs 152A, 152C, it should be appreciated that the PCBs 152A, 152C may have mounting studs 173 at both ends.

When installed in the housing 110, the adjacent ones of the reflectors 165A, 165B, 165C (e.g., the base portions 168 and the sidewalls 163 of the adjacent ones of the reflectors 165A, 165B, 165C) may meet at seams 161 (e.g., as shown in FIG. 2). An adjacent pair of the reflectors 165A, 165B, 165C may be misaligned when installed in the linear lighting device 100. A misaligned adjacent pair of reflectors 165A, 165B, 165C may cause a gap to form at the respective seam 161 between the adjacent pair of reflectors 165A, 165B, 165C (e.g., between the base portions 168 and the sidewalls 163 of the respective reflectors 165A, 165B, 165C). For example, if one of the reflectors 165A, 165B, 165C is not abutting the adjacent reflector, the respective seam 161 may form a gap between the base portions 168 and the sidewalls 163 of the adjacent reflectors, which may allow light from the emitter modules 154 to shine onto the cover lens 120 between the sidewalls 163 of the adjacent reflectors (e.g., adjacent to the sidewalls 122 of the cover lens 120). The cover lens 120 (e.g., the sidewalls 122) may define flanges 126 that extend over (e.g., overhang) the sidewalls 163 of the reflectors 165A, 165B, 165C to block light that enter a gap at one of the seams 161 from contacting the cover lens 122 and creating an unwanted hot spot.

The linear lighting device 100 may comprise one or more insulators 160A, 160B, 160C. The insulators 160A, 160B, 160C may be configured to electrically insulate the reflectors 165A, 165B, 165C from the PCBs 152A, 152B, 152C. For example, the insulators 160A, 160B, 160C may operate as electromagnetic interference (EMI) shields. One of the insulators 160A, 160B, 160C may be aligned with a corresponding one of the PCBs 152A, 152B, 152C. For example, the insulator 160A may be located below and aligned with the PCB 152A, the insulator 160B may be mounted above and aligned with the PCB 152B, and the insulator 160C may be mounted above and aligned with the PCB 152C. For example, the ends of the insulators 160A, 160B, 160C may be aligned with ends of the PCBs 152A, 152B, 152C. Each of the insulators 160A, 160B, 160C may define a plurality of openings 162. Each of the openings 162 may be configured to align with a corresponding one of the emitter modules 154 such that the light generated by the emitter modules 154 passes through the openings 162. Additionally or alternatively, the insulators 160A, 160B, 160C may be secured to the respective PCBs 152A, 152B, 152C using one or more adhesive pads 164.

The emitter modules 154 may emit light toward the cover lens 120. A majority of the light (e.g., center beams) emitted by the emitter modules 154 may radiate towards (e.g., directly towards) the cover lens 120 and create a plurality of hot spots (e.g., high intensity areas) on the cover lens 120. The light emitted by the emitter modules 154 may create a plurality of mid intensity areas and/or a plurality of corresponding low intensity areas between adjacent hot spots on the cover lens 120. Outer beams of light emitted by the emitter modules 154 may radiate toward the cover lens 120 further away from the respective emitter modules 154. The plurality of hot spots may be perceived as individual light sources separated within the linear lighting device 100. It may be desirable to achieve a uniform intensity of light across the length of the linear lighting device 100, for example, such that the light may be perceived as radiating from one source along the length of the linear lighting device 100.

The linear lighting device 100 may comprise one or more internal optical structures 140A, 140B, 140C (e.g., lens assemblies). The internal optical structures 140A, 140B, 140C may be configured to prevent and/or minimize the intensity of hot spots on the cover lens 120 (e.g., such that the hot spots are imperceptible to the human eye), for example, to achieve as uniform of a light intensity on the cover lens 120. Each of the internal optical structures 140A, 140B, 140C may be aligned with a respective one of the lighting modules 150A, 150B, 150C. The internal optical structures 140A, 140B, 140C may be configured to redirect and/or diffuse the light emitted by the emitter modules 154 of the lighting modules 150A, 150B, 150C. For example, the internal optical structure 140A may be aligned with the lighting module 150A, the internal optical structure 140B may be aligned with the lighting module 150B, and the internal optical structure 140C may be aligned with the lighting module 150C. The internal optical structures 140A, 140B, 140C may be adjacent to one another. The combination of the internal optical structures 140A, 140B, 140C may extend the entire length (e.g., in the x-direction) of the linear lighting device 100. For example, the length of the internal optical structures 140A, 140B, 140C when arranged side-by-side may be equal to the length of the linear lighting device 100. Each of the internal optical structures 140A, 140B, 140C may extend for a length of its corresponding lighting module 150A, 150B, 150C. For example, a 3-inch internal optical structure may be used with a 3-inch lighting module and a 4-inch internal optical structure may be used with a 4-inch lighting module.

Each of the internal optical structures 140A, 140B, 140C may comprise an internal lens (e.g., one of the internal lenses 142A, 142B 142C) and one or more light shields 144. The internal optical structures 140A, 140B, 140C may be received in the cavity 167 defined by the reflectors 165A, 165B, 165C. The internal lenses 142A, 142B, 142C may be configured to diffuse the light emitted by the emitter modules 154, for example, before passing through the cover lens 120. The one or more light shields 144 may be configured to be located between a respective one of the internal lenses 142A, 142B, 142C and a respective one of the emitter modules 154. Each of the internal lenses 142A, 142B, 142C may comprise a plurality of apertures 141 that are configured to receive a portion of the one or more light shields 144. For example, the apertures 141 may be configured to secure the light shields 144 to the internal lenses 142A, 142B, 142C. Each of the light shields 144 may define one or more clips 145 that are configured to be received by the apertures 141. For example, each clip 145 may extend through one of the apertures 141 and may abut an upper surface 139 of a respective one of the internal lenses 142A, 142B, 142C. The clip 145 abutting the upper surface 139 may secure the light shield 144 to the respective one of the internal lenses 142A, 142B, 142C.

Each of the internal lenses 142A, 142B, 142C may define a plurality of tabs 143. The plurality of tabs 143 may extend from the internal lenses 142A, 142B, 142C in the y-direction. The tabs 143 may be configured to secure the internal lenses 142A, 142B, 142C within the linear lighting device 100.

The number of light shields 144 for each of the internal optical structures 140A, 140B, 140C may correspond with the number of the emitter modules 154 of a corresponding one of the lighting modules 150A, 150B, 150C. Each of the internal optical structures 140A, 140B, 140C may comprise one of the light shields 144 for each emitter module 154 of its associated lighting module. Each of the light shields 144 may be configured to be located proximate to a respective one of the emitter modules 154 of the lighting modules 150A, 150B, 150C. That is, the light shields 144 of the internal optical structure 140A may be located proximate to (e.g., directly below) the emitter modules 154 of the lighting module 150A, the light shields 144 of the internal optical structure 140B may be located proximate to (e.g., directly below) the emitter modules 154 of the lighting module 150B, and the light shields 144 of the internal optical structure 140C may be located proximate to (e.g., directly below) the emitter modules 154 of the lighting module 150C. For example, the light shields 144 may be located in a path defined by the center beams of each of the emitter modules 154. It should be appreciated that although the light shields 144 are shown in FIG. 2 as being above the respective emitter modules 154, the linear lighting device 100 is shown upside down (e.g., with the cover lens 120 at the top) for view and description purposes.

The internal optical structures 140A, 140B, 140C may be configured to enable substantially uniform brightness and/or color distribution at the cover lens 120 along the length of the linear lighting device 100. For example, the internal optical structures 140A, 140B, 140C may be configured to suppress center beams of light emitted by the plurality of emitter modules 154 and create virtual sources between each of the plurality of emitter modules 154. For example, the light shields 144 may prevent hot spots of light on the cover lens 120 by redirecting one or more portions of the light emitted by a respective emitter module 154. As light is redirected off of the light shields 144, the light is redirected again by the reflectors 165A, 165B, 165C (e.g., base portions 168 of the reflectors 165A, 165B, 165C) toward the cover lens 120 at a location between adjacent emitter modules 154. For example, the redirected light may be perceived as virtual light sources between adjacent emitter modules 154.

The internal optical structures 140A, 140B, 140C (e.g., the light shields 144) may prevent a portion (e.g., of the center beams) of the light emitting from the emitter modules 154 from extending directly through the cover lens 120. Each of the light shields 144 may be configured to redirect at least a portion of light emitted by a respective emitter module 154. For example, each of the light shields 144 may redirect a first portion 155B (e.g., outer beams) of the light emitted by a respective emitter module 154 toward the respective one of the reflectors 165A, 165B, 165C (e.g., the base portions 168 of the reflectors 165A, 165B, 165C) in the z-direction (e.g., in a direction having a z-component). The reflectors 165A, 165B, 165C may redirect the redirected first portion 155B of light toward the internal lenses 142A, 142B, 142C The redirected first portion 155B of light may pass through the internal lenses 142A, 142B, 142C. The internal lenses 142A, 142B, 142C may diffuse the redirected first portion 155B of light. The redirected first portion 155B of light which has been diffused by the internal lenses 142A, 142B, 142C may then pass through the cover lens 120 in an area between adjacent ones of the plurality of emitter modules 154. The cover lens 120 may further diffuse the redirected first portion 155B of light.

Each of the light shields 144 may permit a second portion 155A (e.g., at least a portion of the center beams) of the light emitted by the respective emitter module 154 to pass through the light shield 144 toward the cover lens 120. The second portion 155A of light may be configured such that an unreflected beam of light passes through the cover lens 120 along a length (e.g., in the x-direction) of the linear lighting device 100. The redirected first portion 155B of light and the second portion 155A of light may be substantially evenly distributed across the cover lens 120, for example, to provide a substantially uniform emission of light through the cover lens 120. For example, the substantially uniform emission of light through the cover lens 120 may be created by a combination of direct beams of light from the emitter modules 154 (e.g., the second portion 155A of light); redirecting the first portion of light 155B toward the base portions 168 of the reflectors 165A, 165B, 165C; and reflecting the redirected first portion of light 155B towards the cover lens 120. The light shields 144 may be evenly spaced along the length (e.g., in the x-direction) of the linear lighting device 100.

The linear lighting device 100 may comprise an optical system. The optical system may comprise the cover lens 120, one or more of the internal lenses 142A, 142B, 142C, one or more light shields 144, and one or more of the reflectors 165A, 165B, 165C. The optical system may be configured to redirect and diffuse the light emitted by the emitter modules 154 such that a uniform distribution of light radiates from the cover lens 120.

The reflectors 165A, 165B, 165C may be configured to retain the internal optical structures 140A, 140B, 140C. For example, each of the reflectors 165A, 165B, 165C may define a plurality of apertures 169 in the sidewalls 163. The apertures 169 may be configured to receive corresponding features (e.g., the tabs 143) of the internal optical structures 140A, 140B, 140C. The apertures 169 may receive the tabs 143 of the internal lenses 142A, 142B 142C to secure the respective internal optical structures 140A, 140B, 140C within the cavity 167.

The linear lighting device 100 may also comprise mounting brackets 180A, 180B. The mounting brackets 180A, 180B may be configured to attach the linear lighting device 100 to the structure. For example, the mounting brackets 180A, 180B may engage the upper surface 112 of the housing 110. The mounting brackets 180A, 180B may define respective holes 182A, 182B that are configured to receive respective fasteners 184A, 184B configured to attach the mounting brackets 180A, 180B to the structure.

FIGS. 3A-3E are perspective views of example lighting modules 200A, 200B, 200C, 200D, 200E (e.g., such as the lighting modules 150A, 150B, 150C shown in FIG. 2). The lighting modules 200A, 200B, 200C, 200D, 200E may be configured to be used in a lighting device (e.g., such as the lighting device 100). Each of the lighting modules 200A, 200B, 200C, 200D, 200E may comprise respective printed circuits board (PCB) 202 (e.g., such as the PCBs 152A, 152B, 152C of the lighting device 100). Each of the PCBs 202 may have a length of 3 or 4 units (e.g., 3 or 4 inches, centimeters, etc.). When the PCBs 202 of the lighting modules 200A, 200B, 200C, 200D, 200E have a length of 3 or 4 units, the lighting device may be configured to have any length of 10 units or greater in one unit increments. Also, when the PCBs 202 have a length of 3 or 4 units, the lighting device may be configured to have a length of 3 units (e.g., one 3 unit PCB), 4 units (e.g., one 4 unit PCB), 6 units (e.g., two 3 unit PCBs), 7 units (e.g., one 3 unit PCB and one 4 unit PCB), 8 units (e.g., two 4 unit PCBs), or 9 units (e.g., three 3 unit PCBs). Each of the lighting modules 200A, 200B, 200C, 200D, 200E may include a plurality of emitter modules 210 (e.g., the emitter modules 154) mounted to the respective PCBs 202. The number of emitter modules 210 may be based on a length of the PCB of the respective emitter lighting module. For example, a 3-inch lighting module may include three emitter modules 210 and a 4-inch lighting module may include four emitter modules 210. The emitter modules 210 may be aligned linearly on each of the printed circuit boards 202 as shown in FIGS. 3A-3E. For example, the emitter modules 210 may be equally spaced apart, e.g., approximately one inch apart. Although the lighting modules 200A, 200B, 200C, 200D, 200E are depicted in FIGS. 3A-3E with three or four emitter modules 210 linearly aligned and equally spaced apart, the lighting modules 200A, 200B, 200C, 200D, 200E could have any number of emitter modules in any alignment and spaced apart by any distance.

The emitter modules 210 on the lighting modules 200A, 200B, 200C, 200D, 200E may be rotated (e.g., in a plane defined by the x-axis and the y-axis) with respect to one another. For example, a first emitter module may be arranged in a first orientation and an adjacent emitter module may be arranged in a second orientation that is rotated by a predetermined angle with respect to the first orientation. Successive emitter modules may be arranged in orientations that are rotated by the predetermined angle with respect to an adjacent emitter module.

When one of the lighting modules 200A, 200B, 200C, 200D, 200E has four emitter modules (e.g., is four inches in length), each of the emitter modules 210 may be rotated by 90 degrees with respect to adjacent emitter modules 210. For example, the second emitter module (e.g., in the x-direction) may be rotated 90 degrees (e.g., clockwise or counter-clockwise) from the first emitter module, the third emitter module (e.g., in the x-direction) may be rotated 90 degrees in the same direction (e.g., clockwise or counter-clockwise), and the fourth emitter module may be rotated 90 degrees in the same direction (e.g., clockwise or counter-clockwise) with respect to the third emitter module. Stated differently, the second emitter module may be oriented 90 degrees offset from the first emitter module, the third emitter module may be oriented 180 degrees offset from the first emitter module, and the fourth emitter module may be oriented 270 degrees offset from the first emitter module.

When one of the lighting modules 200A, 200B, 200C, 200D, 200E has three emitter modules (e.g., is three inches in length), each of the emitter modules 210 may be rotated by 120 degrees with respect to adjacent emitter modules 210. For example, the second emitter module (e.g., in the x-direction) may be rotated 120 degrees (e.g., clockwise or counter-clockwise) from the first emitter module, and the third emitter module (e.g., in the x-direction) may be rotated 120 degrees in the same direction (e.g., clockwise or counter-clockwise) with respect to the second emitter module. Stated differently, the second emitter module may be oriented 120 degrees offset from the first emitter module, the third emitter module may be oriented 240 degrees offset from the first emitter module.

Figure 3A:
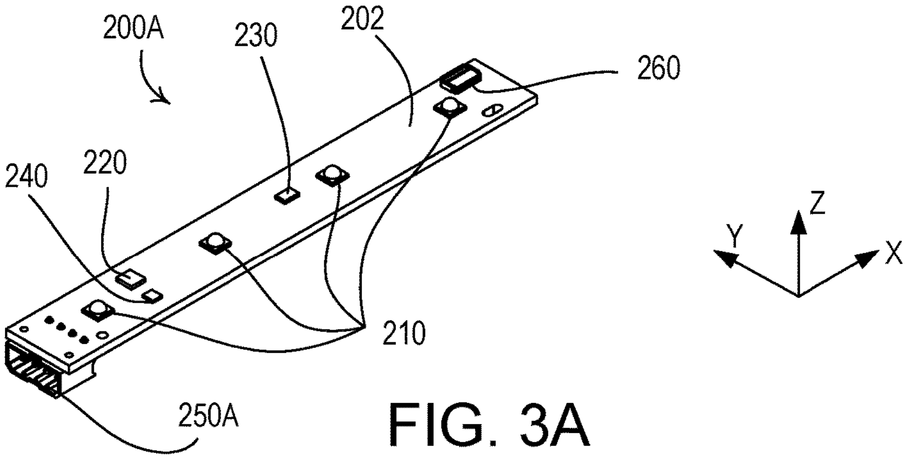
FIGS. 3A-3E are example light emitting diode (LED) printed circuit boards for the lighting device of FIG. 1.

FIG. 3A depicts an example master lighting module 200A (e.g., such as the lighting module 150A shown in FIG. 2). The master lighting module 200A may include a plurality of emitter modules 210 (e.g., four) mounted to the PCB 202. The PCB 202 of the master lighting module 200A may have a length that is defined in four units (e.g., four inches, four centimeters, etc.). It should be appreciated that the master lighting module 200A may also have a length that is defined in three units. The master lighting module 200A may include a master control circuit 220 and an emitter control circuit 230. The master lighting module 200A may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the master lighting module 200A. The master control circuit 220 may be configured to receive messages (e.g., from a fixture controller such as the fixture controller 520 shown in FIG. 6), for example, via the communication circuit 240. The messages may include control data and/or commands for controlling the emitter modules 210. The master control circuit 220 may be configured to control one or more other lighting modules, for example, drone lighting modules, based on receipt of the messages. For example, the messages may be received by the communication circuit 240. The communication circuit 240 may relay the messages to the master control circuit 220. The master control circuit 220 may send the messages to the emitter control circuit 230 of the master lighting module 200A and to the emitter control circuit 230 of any other drone lighting module (e.g., such as the drone lighting modules 200B, 200C, 200D, 200E) of the lighting device.

The master lighting module 200A may include a connector 250A (e.g., the connector 132A shown in FIG. 2) that is configured to connect the master lighting module 200A to a fixture controller (e.g., such as the fixture controller 520 shown in FIG. 6) or another lighting module (e.g., a drone lighting module). The connector 250A may be a female connector. The master lighting module 200A may include a socket 260 (e.g., one of the sockets 159 shown in FIG. 2) that is configured to connect the master lighting module 200A to an adjacent drone lighting module. The socket 260 may be configured to receive a cable (e.g., such as the cable 160 shown in FIG. 2). For example, the socket 260 may comprise a zero-insertion force (ZIF) connector. Although FIG. 3A depicts the master module 200A having one socket 260, it should be appreciated that the master module 200A may have two sockets 260 (e.g., one at each end of the board 202). For example, a lighting device may have more than one master module 200A. When there are two or more master modules in a lighting device, the first master module may be a starter master module (e.g., such as master module 200A) with one socket 260 and the second master module may be a master middle module with two sockets 260. The master middle module may be configured to connect to two drone lighting modules (e.g., one on each side of the master middle module).

Figure 3B:
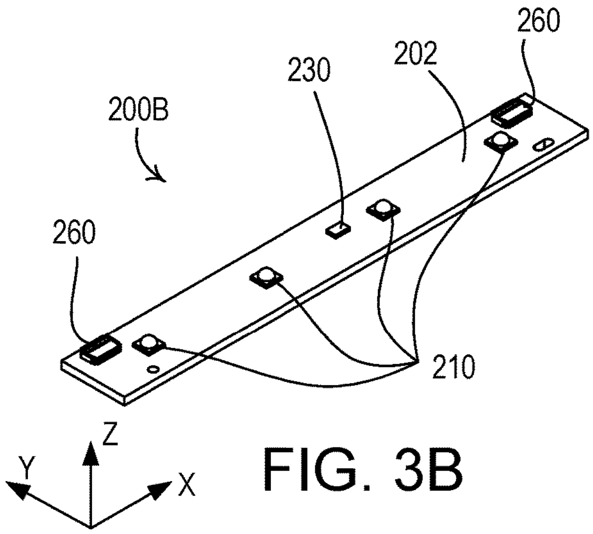

FIG. 3B depicts an example drone lighting module 200B (e.g., a middle drone lighting module, such as the lighting module 150B shown in FIG. 2). The drone lighting module 200B may include a plurality of emitter modules 210 (e.g., four) mounted to a PCB 202. The PCB 202 of the drone lighting module 200B may have a length that is defined in four units (e.g., four inches, four centimeters, etc.). The drone lighting 200B may include an emitter control circuit 230 (e.g., the emitter processor 156B shown in FIG. 2). The drone lighting module 200B may also comprise a drive circuit (not shown) configured to conduct current through one or more emitters of each of the emitter modules 210 to cause the emitter modules to emit light. The emitter control circuit 230 of the drone lighting module 200B may receive messages from the master lighting module 200A. The emitter control circuit 230 may be configured to control the drive circuit to control the intensity level and/or color of the light emitted by the plurality of emitter modules 210 mounted to the PCB 202 of the drone lighting module 200B. The drone lighting module 200B may include a pair of sockets 260 (e.g., two of the sockets 159 shown in FIG. 2) that are configured to connect the drone lighting module 200B to one or more adjacent drone lighting modules and/or a master lighting module. The sockets 260 may be configured to receive cables (e.g., such as the cables 160 shown in FIG. 2). For example, the sockets 260 may comprise a zero-insertion force (ZIF) connectors.

Figure 3C:
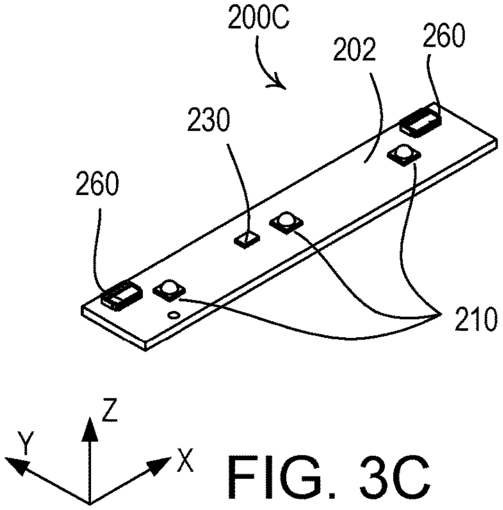

FIG. 3C depicts another example drone lighting module 200C (e.g., a middle drone lighting module). The drone lighting module 200C may include a plurality of emitter modules 210 (e.g., three) mounted to a PCB 202. The PCB 202 of the drone lighting module 200C may have a length that is defined in three units (e.g., three inches, three centimeters, etc.). The drone lighting module 200C may include an emitter control circuit 230 (e.g., an emitter processor). The emitter control circuit 230 of the drone lighting module 200C may receive messages from the master lighting module 200A. The drone lighting module 200C may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the drone lighting module 200C. The drone emitter PCB 200C may include a pair of sockets 260 (e.g., two of the sockets 159 shown in FIG. 2) that are configured to connect the drone lighting module 200B to one or more adjacent drone lighting module and/or a master lighting module. The sockets 260 may be configured to receive cables (e.g., such as the cables 160 shown in FIG. 2). For example, the sockets 260 may comprise a zero-insertion force (ZIF) connectors.

Figure 3D:
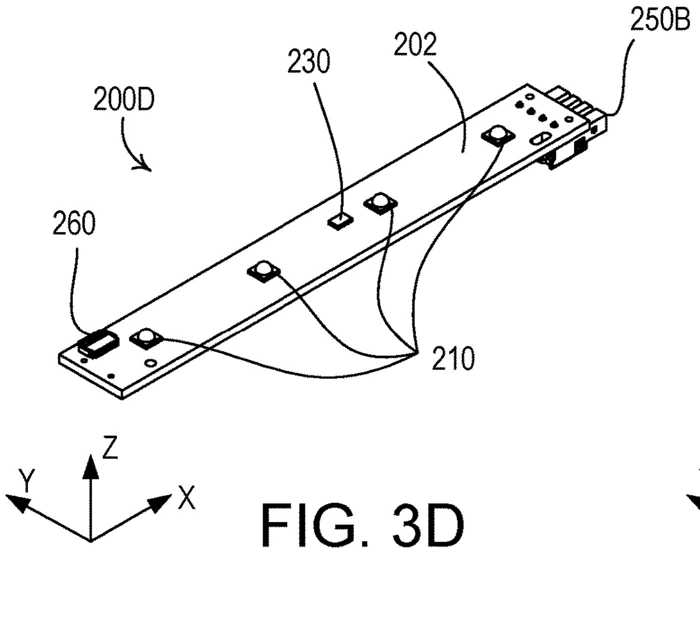

FIG. 3D depicts an example drone lighting module 200D (e.g., an end drone lighting module, such as the lighting module 150C shown in FIG. 2). The drone lighting module 200D may include a plurality of lighting modules 210 (e.g., four) mounted to a PCB 202. The PCB 202 of the drone lighting module 200D may have a length that is defined in four units (e.g., four inches, four centimeters, etc.). The drone lighting module 200D may include an emitter control circuit 230 (e.g., the emitter processor 156C shown in FIG. 2). The emitter control circuit 230 of the drone lighting module 200D may receive messages from the master lighting module 200A. The drone lighting module 200D may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the drone lighting module 200D. The drone lighting module 200D may include a connector 250B (e.g., the connector 132B shown in FIG. 2) that is configured to connect the drone lighting module 200D to another lighting device (e.g., a master lighting module of the other lighting device). The connector 250B may be a male connector. The drone lighting module 200D may include a socket 260 (e.g., one of the sockets 159 shown in FIG. 2) that is configured to connect the drone lighting module 200D to an adjacent drone lighting module or a master lighting module. The receptacle 260 may be configured to receive a cable (e.g., such as the cable 160 shown in FIG. 2). For example, the socket 260 may comprise a zero-insertion force (ZIF) connector.

Figure 3E:
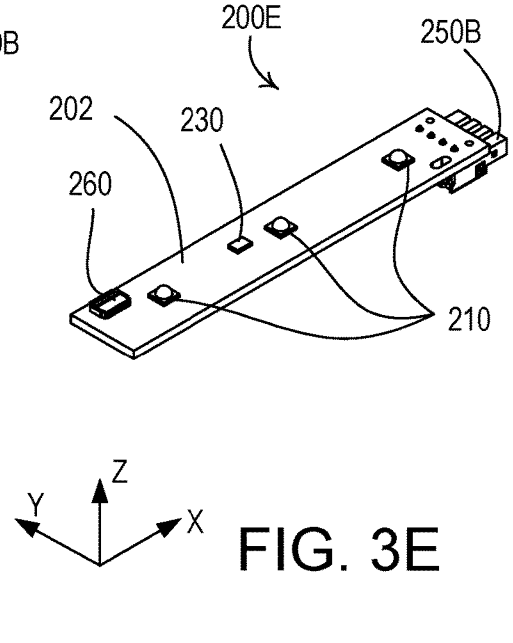

FIG. 3E depicts an example drone lighting module 200E (e.g., an end drone lighting module). The drone lighting module 200E may include a plurality of emitter modules 210 (e.g., three) mounted to a PCB 202. The PCB 202 of the drone lighting module 200E may have a length that is defined in three units (e.g., three inches, three centimeters, etc.). The drone lighting module 200E may include an emitter control circuit 230 (e.g., an emitter processor). The emitter control circuit 230 of the drone lighting module 200E may receive messages from the master lighting module 200A. The drone lighting module 200E may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the drone lighting module 200E. The drone lighting module 200E may include a connector 250B (e.g., the connector 132B shown in FIG. 2) that is configured to connect the drone lighting module 200E to another lighting device (e.g., a master lighting module of the other lighting device). The connector 250B may be a male connector. The drone lighting device 200E may include a socket 260 (e.g., one of the sockets 159 shown in FIG. 2) that is configured to connect the drone lighting device 200E to an adjacent drone lighting module or a master lighting module. The socket 260 may be configured to receive a cable (e.g., such as the cable 160 shown in FIG. 2). For example, the socket 260 may comprise a zero-insertion force (ZIF) connector.

Figure 4A:
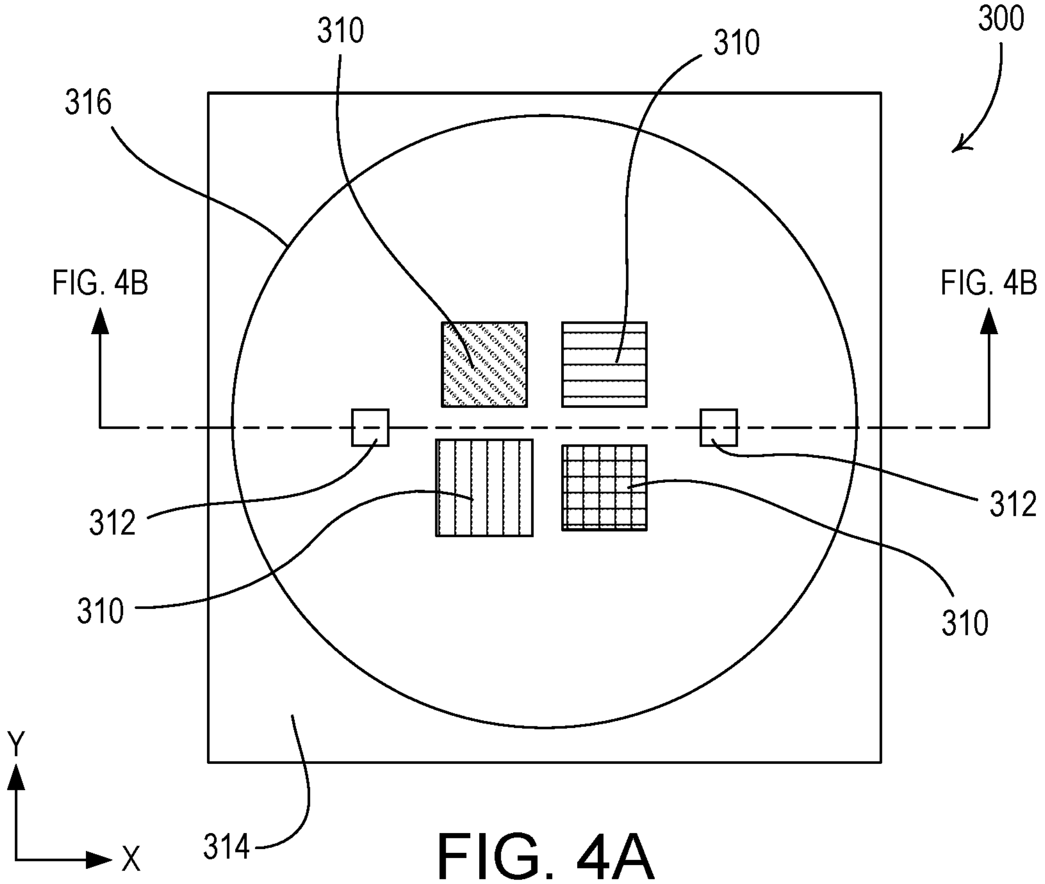
FIG. 4A is a top view of an example emitter module.
Figure 4B:
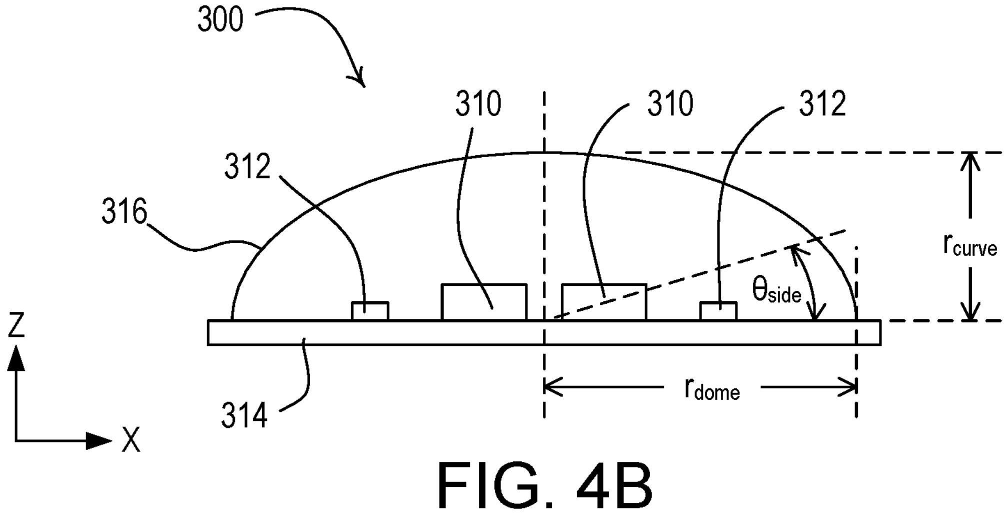
FIG. 4B is a side cross-sectional view of the emitter module of FIG. 5A.

FIG. 4A is a top view of an example emitter module 300 (e.g., an emitter assembly), such as the emitter modules 154 shown in FIG. 2 and/or the emitter modules 210 shown in FIGS. 3A-3E. FIG. 4B is a side cross-section view of the emitter module 300 taken through the center of the emitter module (e.g., through the line shown in FIG. 4A). The emitter module 300 may comprise an array of emitters 310 (e.g., emission LEDs). In some examples, the emitter module 300 may also include (e.g., optionally include) detectors 312 (e.g., detection LEDs). For example, the emitter module 300 may include four emitters 310 and two detectors 312 as shown in FIG. 4A. In some examples, the emitters 310 and the detectors 310 may be mounted on a substrate 314. The emitters 310 and the detectors 312 may be encapsulated by a dome 316. The emitters 310, the detectors 312, the substrate 314, and the dome 316 may form an optical system. The emitters 310 may each emit light of a different color (e.g., red, green, blue, and white or amber), and may be arranged in a square array as close as possible together in the center of the dome 316, so as to approximate a centrally located point source. The detectors 312 may be any devices that produce currents indicative of incident light, such as a silicon photodiode or an LED. For example, the detectors 312 may each be an LED having a peak emission wavelength in the range of approximately 550 nm to 700 nm, such that the detectors 312 may not produce photocurrent in response to infrared light (e.g., to reduce interference from ambient light). For example, a first one of the detectors 312 may comprise a small red, orange or yellow LED, which may be used to measure a luminous flux of the light emitted by the red LED of the emitters 310. A second one of the detectors 312 may comprise a green LED, which may be used to measure a respective luminous flux of the light emitted by each of the green and blue LEDs of the emitters 310. Both of the detectors 312 may be used to measure the luminous flux of the white LED of the emitters 310 at different wavelengths (e.g., to characterize the spectrum of the light emitted by the white LED).

The substrate 314 may be mounted to a printed circuit board (PCB) that includes drive and control circuitry for the emitter module 300 (e.g., the PCBs 152A, 152B, 152C and/or the PCBs 202). The substrate 314 of the emitter module 300 may be a ceramic substrate formed from an aluminum nitride or an aluminum oxide material or some other reflective material, and may function to improve output efficiency of the emitter module 300 by reflecting light out of the emitter module through the dome 316. In some examples, the emitters 310 and/or the detectors 312 of the emitter modules 310 may be mounted directly to the printed circuit board that includes the drive and control circuitry for the emitter module 300. For example, the printed circuit board may be a rigid PCB (e.g., made from an FR4 material) and/or a metal core PCB.

The dome 316 may comprise an optically transmissive material, such as silicon or the like, and may be formed through an over-molding process, for example. A surface of the dome 316 may be lightly textured to increase light scattering and promote color mixing, as well as to reflect a small amount of the emitted light back toward the detectors 312 mounted on the substrate 314 (e.g., about 5%). The size of the dome 316 (e.g., a diameter of the dome in a plane of the LEDs 310) may be generally dependent on the size of the LED array. The diameter of the dome may be substantially larger (e.g., about 1.5 to 4 times larger) than the diameter of the array of LEDs 310 to prevent occurrences of total internal reflection.

The size and shape (e.g., curvature) of the dome 316 may also enhance color mixing when the emitter module 300 is mounted near other emitter modules (e.g., in a similar manner as the emitter modules 210 mounted to the emitter PCBs 200A, 200B, 200C, 200D, 200E of the lighting device 100). For example, the dome 316 may be a flat shallow dome as shown in FIG. 4B. A radius $r_{dome}$ of the dome 316 in the plane of the emitters 310 array may be, for example, approximately 20-30% larger than a radius $r_{curve}$ of the curvature of the dome 316. For example, the radius $r_{dome}$ of the dome 316 in the plane of the LEDs 310 may be approximately 4.8 mm and the radius $r_{curve}$ of the dome curvature (e.g., the maximum height of the dome 316 above the plane of the LEDs 310) may be approximately 3.75 mm. Alternatively, the dome 316 may have a hemispherical shape. In addition, one skilled in the art would understand that alternative radii and ratios may be used to achieve the same or similar color mixing results.

By configuring the dome 316 with a substantially flatter shape, the dome 316 allows a larger portion of the emitted light to emanate sideways from the emitter module 300 (e.g., in an X-Y plane as shown in FIGS. 5A and 5B). Stated another way, the shallow shape of the dome 316 allows a significant portion of the light emitted by the emitters 310 to exit the dome at small angles Oside relative to the horizontal plane of the array of emitters 310. For example, the dome 316 may allow approximately 40% of the light emitted by the array of emitters 310 to exit the dome 316 at approximately 0 to 30 degrees relative to the horizontal plane of the array of emitters 310. When the emitter module 300 is mounted near other emitter modules (e.g., as in a linear light source such as the lighting device 100), the shallow shape of the dome 316 may improve color mixing in the lighting device by allowing a significant portion (e.g., 40%) of the light emitted from the sides of adjacent emitter modules to intermix before that light is reflected back out of the lighting device. Examples of emitter modules, such as the emitter module 200, are described in greater detail in U.S. Pat. No. 10,161,786, issued Dec. 25, 2018, entitled EMITTER MODULE FOR AN LED ILLUMINATION DEVICE, the entire disclosure of which is hereby incorporated by reference.

Figure 5:
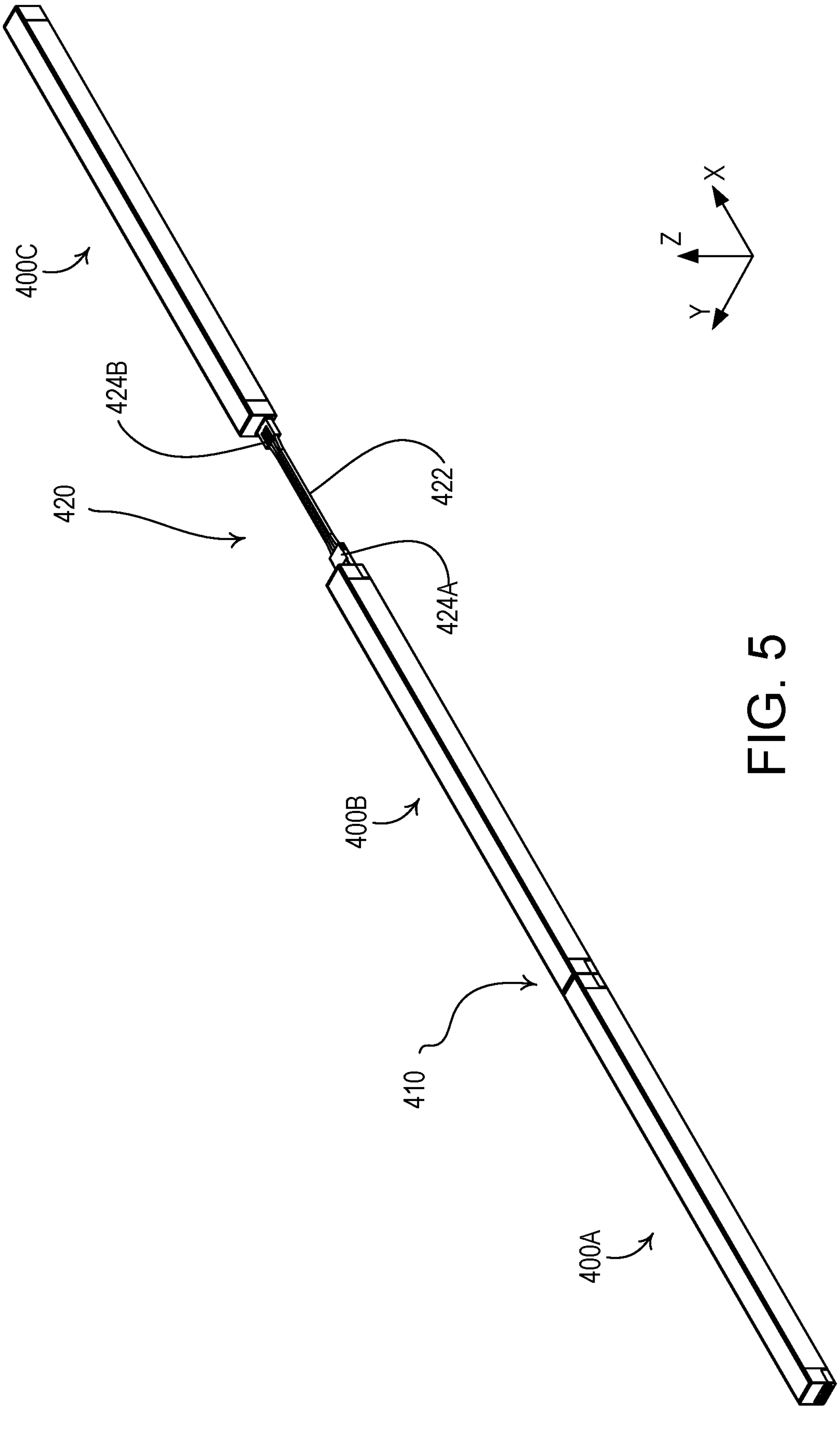
FIG. 5 is a perspective view showing example end-to end and wired connections of the lighting devices of FIG. 1.

FIG. 5 is a perspective view of a lighting fixture assembly 401 comprising a plurality of example lighting devices 400A, 400B, 400C (e.g., linear lighting fixtures) connected (e.g., serially-connected) together. The lighting devices 400A, 400B, 400C may be an example of the lighting device 100 shown in FIGS. 1, 2. The lighting devices 400A, 400B, 400C may be directly connected (e.g., via an end-to-end connection 410) or via a wired connection 420. For example, the lighting device 400A may be directly connected to the lighting device 400B using an end-to-end connection 410. The end-to-end connection 410 may include a male connector (e.g., such as the connector 132B shown in FIG. 1 and/or the connector 250B shown in FIGS. 3D, 3E) of the lighting device 400A engaging with (e.g., received within) a female connector (e.g., such as the connector 132A shown in FIGS. 1, 2 and/or the connector 250A shown in FIG. 3A). Although the end-to-end connection 410 is shown as a straight connection, it should be appreciated that the end-to-end connection 410 may also include an angled connection (e.g., such as a 90-degree connection). The lighting device 400B may be connected to the lighting device 400C using the wired connection 420. The wired connection 420 may include a cable 422 that is configured to engage (e.g., received by or within) with a connector (e.g., such as the connector 132B shown in FIG. 1 and/or the connector 250B shown in FIGS. 3D, 3E) of the lighting device 400B. The cable 422 may be configured to engage (e.g., received by or within) with a connector (e.g., such as the connector 132A shown in FIGS. 1, 2 and/or the connector 250A shown in FIG. 3A) of the lighting device 400C. For example, the cable 422 may define connectors 424A, 424B configured to mate with the connectors of the lighting device 400A, 400B. The length of the cable 422 may be configured based on the installation location of the lighting devices 400B, 400C.

Although FIG. 5 depicts three lighting devices 400A, 400B, 400C connected together using the end-to-end connection 410 and the wired connection 420, it should be appreciated that more or fewer than three lighting devices may be connected together using any combination of end-to-end connections 410 and/or wired connections 420.

Figure 6:
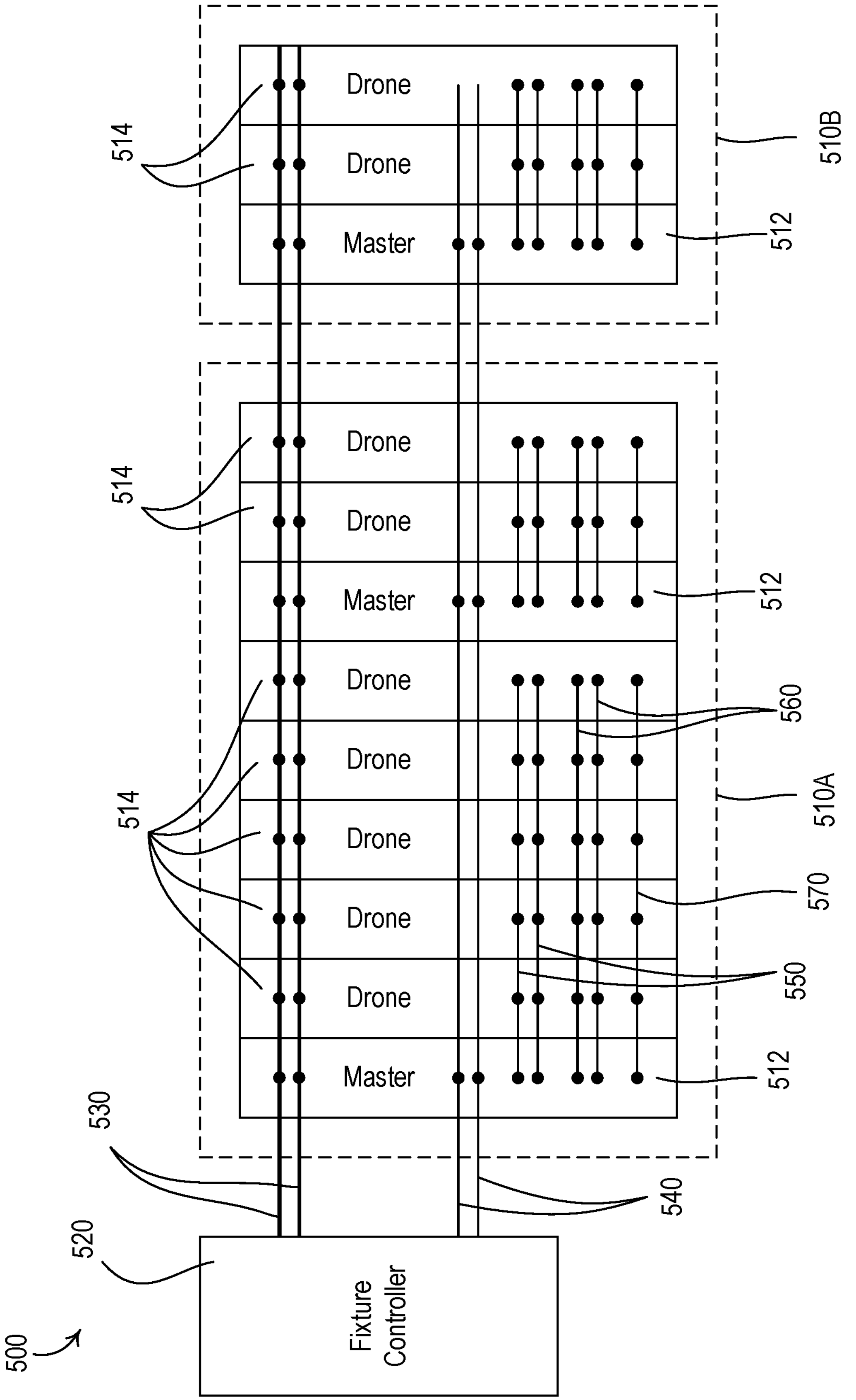
FIG. 6 is a simplified block diagram of a linear lighting assembly using the lighting device of FIG. 1.

FIG. 6 is a simplified block diagram of a lighting system 500. The lighting system 500 may include a fixture controller 520 (e.g., a controller and/or a lighting controller) and a lighting fixture assembly (e.g., such as the lighting fixture assembly 401 shown in FIG. 5) that includes a plurality of serially-connected lighting devices 510A, 510B (e.g., such as the lighting device 100 shown in FIGS. 1, 2 and/or the lighting devices 400A, 400B, 400C shown in FIG. 5), and wiring that is used to connect the fixture controller 520 and/or lighting devices 510A, 510B to one another (e.g., the cable 422). The fixture controller 520 may receive a line voltage input (e.g., an alternating-current (AC) mains line voltage from an AC power source) and may generate a bus voltage (e.g., a direct-current (DC) bus voltage) on a power bus 530 (e.g., power wiring) for powering the plurality of lighting devices 510A, 510B. Each of the lighting devices 510A, 510B may include one or more master lighting modules 512 (e.g., such as the master lighting module 200A shown in FIG. 3A) and one or more drone lighting modules 514 (e.g., such as the drone lighting modules 200B, 200C, 200D, 200E shown in FIGS. 3B-3E). Each of the master lighting modules 512 and the drone lighting modules 514 of the lighting devices 510A, 510B may be coupled to the power bus 530 for receiving the bus voltage. Although the master lighting module 512 is illustrated in closest proximity to the fixture controller 520, in some examples the lighting devices 510A may be connected to the fixture controller 520 (e.g., rotated or flipped) such that the drone lighting module 514 is located between the fixture controller 520 and the master lighting module 512.

The fixture controller 520 may comprise one or more communication circuits that are configured to communicate (e.g., transmit and/or receive) messages. The fixture controller 520 may be configured to communicate the messages on a wireless communication link, such as a radio-frequency (RF) communication link (e.g., via wireless signals) and/or via a wired communication link (e.g., a digital or analog communication link). The fixture controller 520 may be configured to receive messages including control data and/or commands for controlling the lighting devices 510A, 510B (e.g., for controlling the intensity level and/or color of the lighting devices 510A, 510B) from external devices for example, other control devices of a load control system, such as a remote control device and/or a system controller. In addition, the fixture controller 520 may be configured to transmit messages including control data and/or commands for controlling the lighting devices 510A, 510B (e.g., for controlling the intensity level and/or color of the lighting devices 510A, 510B) to the lighting devices 510A, 510B (e.g., the master lighting modules 512).

One fixture controller (e.g., such as the fixture controller 520) may be used to control and/or power a plurality of lighting devices (e.g., such as the lighting devices 510A, 510B) of the lighting system 500 that are connected together (e.g., serially-connected together via the power bus 530). The fixture controller 520 may be configured to communicate messages with the plurality of linear lighting devices 510A, 510B. For example, the fixture controller 520 may transmit one or more messages to the master lighting modules 512 in each of the plurality of lighting devices 510A, 510B via a master communication bus 540 (e.g., a first wired digital communication link, such as an RS-485 communication link). In some examples, the master communication bus 540 may be connected to the master lighting modules 512 (e.g., all of the master lighting modules 512), but not the drone lighting modules 514. Each of the master lighting modules 512 may comprise a master communication circuit for transmitting and/or receiving messages on the master communication bus 540. In some examples, such as when the master communication bus 540 is an RS-485 communication link, the master communication circuit may be an RS-485 transceiver. The messages may include control data and/or commands for controlling the lighting devices 510A, 510B (e.g., intensity level, color control information, and/or the like, requests for information, e.g., such as address information, from the lighting devices 510A, 510B, etc.).

The magnitude of the bus voltage developed across the power bus 530 may vary based on the length along the power bus 530. For instance, the magnitude of the bus voltage may decrease along the length of the power bus 530 due to a voltage drop due to the resistance of the wiring of the power bus 530 and the current drawn to each of the master lighting modules 512 and drone lighting modules 514 coupled to the power bus 530. Therefore, the master lighting modules 512 located further from the fixture controller 520 may receive the bus voltage at a lower magnitude than the master lighting modules located closest to fixture controller 520.

The magnitude of the bus voltage that is received by the master lighting module 512 that is located farthest from the fixture controller 520 on the power bus 530 may be the smallest magnitude of the bus voltage that is received by all of the master lighting modules 512 of the lighting system 500. The one of the master lighting modules 512 that is located the farthest from the fixture controller 520 may be known as the "end master lighting module" and the magnitude of the bus voltage received by the end master lighting module may be known as an "end bus voltage magnitude". Stated another way, the end master lighting module may be the master lighting module 512 that has the longest amount of wiring of the power bus 530 between that master lighting module 512 and the fixture controller 520. As noted herein, the total length of the power bus 530 may vary based on the specifics of the particular installation of the lighting system 500, and therefore, the end bus voltage magnitude may vary across a variety of different power bus wiring topologies.

The fixture controller 520 may be configured to determine an order of the plurality of master lighting modules 512 coupled to the power bus 530 and the master communication bus 540. For example, the fixture controller 520 may use measured voltages and/or communications to determine the order of the plurality of master lighting modules 512. The fixture controller 520 may be configured to determine which of the master lighting modules 512 that is located the farthest from the fixture controller 520 on the power bus 530 (e.g., which of the master lighting modules 512 is the end master lighting module).

The fixture controller 520 and/or the master lighting modules 512 may be configured to determine which master lighting module 512 coupled to the power bus 530 is the end master lighting module based on bus voltage measurements performed by the master lighting modules 512. For example, the fixture controller 520 may send a query message to the master lighting modules 512 coupled to the power bus 530. The query message may request that the master lighting modules 512 send the fixture controller 520 an indication of a measurement of the magnitude of the bus voltage (e.g., a bus voltage measurement). The fixture controller 520 may determine that the end master lighting module is the master lighting module 512 that reports the lowest bus voltage measurement.

Alternatively or additionally, the master lighting modules 512 that are coupled to the power bus 530 may be configured to send (e.g., automatically and/or periodically send) a measurement of the magnitude of the bus voltage (e.g., across the power bus 530). Each master lighting module 512 may receive the respective measurements of the bus voltage from the other master lighting modules 512 that are coupled to the power bus 530. In such examples, each master lighting modules 512 may be configured to determine whether it sent the lowest bus voltage measurement, and the master lighting module 512 that sent the lowest bus voltage measurement may configured itself as the end master lighting module 512. In such examples, the end master lighting modules may be configured to send (e.g., periodically send) the bus voltage measurement to the fixture controller 520 (e.g., without the fixture controller 520 transmitting a query message), for example, so that the master lighting modules 512 can determine which master lighting module 512 is the end lighting module.

The master lighting module 512 may be coupled to a plurality of the drone lighting modules 514 via one or more electrical connections, such as a drone communication bus 550 (e.g., an Inter-Integrated Circuit ($I^2C$) communication link), timing signal lines 560 (e.g., timing signal electrical conductors), and/or an interrupt request (IRQ) signal line 570 (e.g., an IRQ electrical conductor). The master lighting modules 512 may receive the messages from the fixture controller 520, and may relay the messages to the drone lighting modules 514 via the drone communication bus 550. For example, the master lighting modules 512 may convert the messages from the RS-485 communication protocol to the $I^2C$ communication protocol for transmission over the drone communication bus 550. In some examples, the master lighting module 512 may communication control messages including control data and/or command (e.g., intensity level and/or color control commands) over the drone communication bus 550.

The fixture controller 520 may be configured to control the intensity level and/or color (e.g., color temperature) of the light emitted by each of the master lighting modules 512 and the drone lighting modules 514. The fixture controller 520 may be configured to individually or collectively control the intensity levels and/or colors of each of the master lighting modules 512 and the drone lighting modules 514. For example, the fixture controller 520 may be configured to control the master lighting modules 512 and the drone lighting modules 514 of one of the lighting devices 510A, 510B to the same intensity level and/or the same color, or to different intensity levels and/or different colors. Further, in some examples, the fixture controller 520 may be configured to control the master lighting modules 512 and the drone lighting modules 514 of one of the lighting devices 510A, 510B to different intensity levels and/or colors in an organized manner to provide a visual effect, for example, to provide a gradient of intensity levels and/or colors along the length of one or more of the linear lighting devices 510A, 510B.

Each of the drone lighting modules 514 may be configured to use the IRQ signal line 570 to signal to the respective master lighting module 512 that service is needed and/or that the drone lighting module 512 has a message to transmit to the master lighting module 512. In some examples, the IRQ signal line 570 may be used to configure the drone lighting modules 514, for example, to determine the order and/or location of each drone lighting module 514 that is part of the lighting device.

As described in more detail herein, the master lighting modules 512 may receive messages from the fixture controller 520 via the master communication bus 540. In some examples, the fixture controller 520 may be configured to interrupt the transmission of the messages on the master communication bus 540 to generate a synchronization pulse (e.g., a synchronization frame). The fixture controller 520 may generate the synchronization pulse periodically on the master communication bus 540 during periods where other communication across the master communication bus 540 is not occurring. The master lighting modules 512 may be configured to generate a timing signal that is received by the drone lighting modules 514 on the timing signal lines 560. In some examples, the master lighting module 512 may receive the synchronization pulse from the fixture controller 520, and in response, generate the timing signal on the timing signal lines 560, where for example, the timing signal may be a sinusoidal waveform that is generated at a frequency that is determined based on a frequency of synchronization pulse received from the fixture controller 120. The master lighting module 512 and the drone lighting modules 514 may use the timing signal to coordinate a timing at which the master lighting module 512 and the drone lighting modules 514 can perform a measurement procedure (e.g., to reduce the likelihood that any module causes interference with the measurement procedure of another module). For example, the master lighting module 512 and the drone lighting modules 514 may use the timing signal to determine a time to measure optical feedback information of the lighting loads of its module to, for example, perform color and/or intensity level control refinement, when other master and drone lighting modules are not emitting light.

Figure 7:
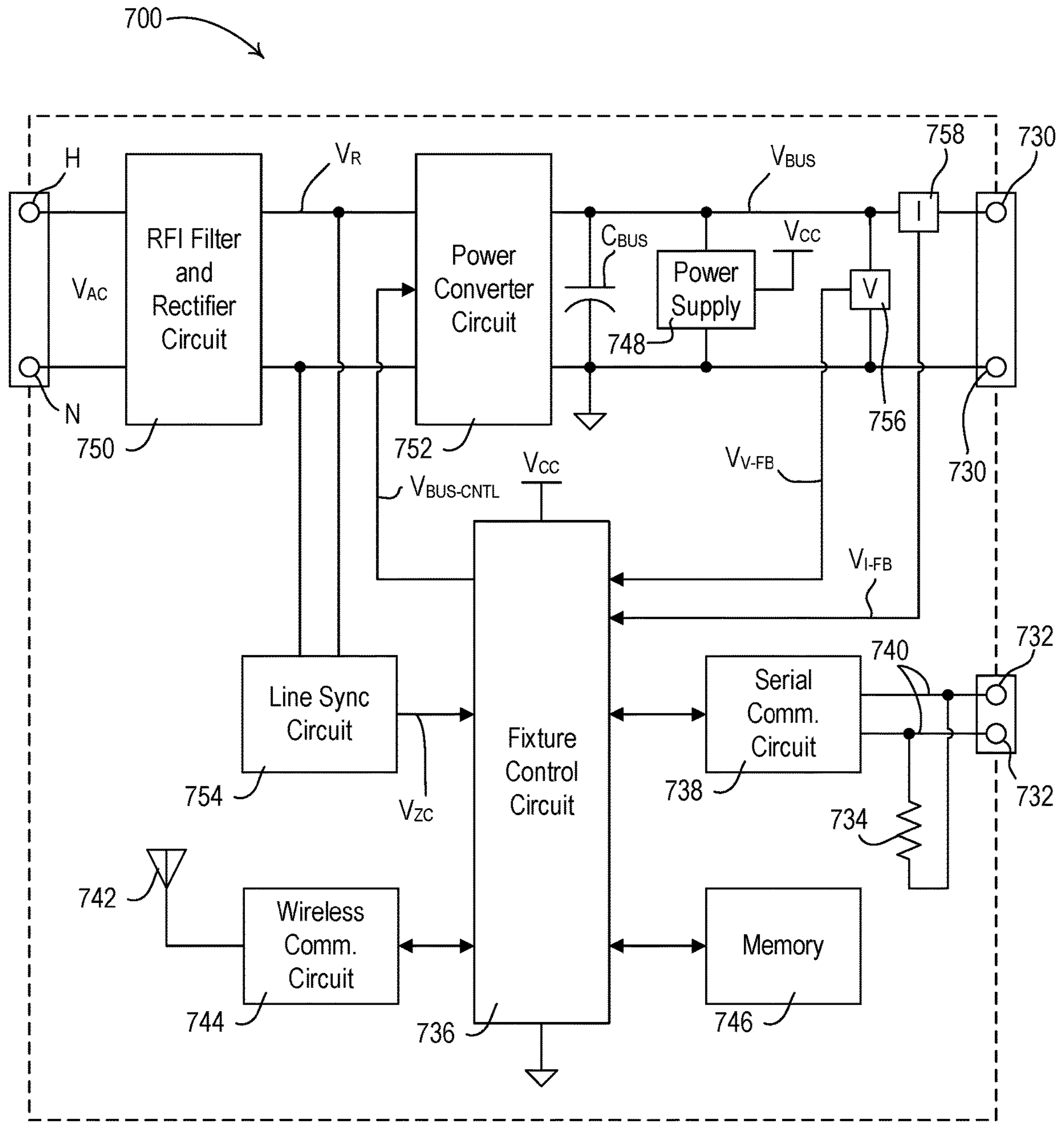
FIG. 7 is a simplified block diagram of an example fixture controller.

FIG. 7 is a simplified block diagram of an example fixture controller 700 (e.g., a lighting controller such as the fixture controller 520 shown in FIG. 6). The fixture controller 700 may comprise a radio frequency interference (RFI) filter and rectifier circuit 750, which may receive a source voltage, such as an AC mains line voltage $V_{AC}$, via a hot connection H and a neutral connection N. The radio frequency interference (RFI) filter and rectifier circuit 750 may be configured to generate a rectified voltage $V_R$ from the AC mains line voltage $V_{AC}$. The radio frequency interference (RFI) filter and rectifier circuit 750 may also be configured to minimize the noise provided on the AC mains (e.g., at the hot connection H and the neutral connection N).

The fixture controller 700 may also comprise a power converter circuit 752 that may receive the rectified voltage $V_R$ and generate a bus voltage $V_{BUS}$ (e.g., having a magnitude of approximately 15-20V) across a bus capacitor $C_{BUS}$. The power converter circuit 752 may be configured to adjust a magnitude of the bus voltage $V_{BUS}$ generated by the power converter circuit 752 (e.g., a generated bus voltage magnitude $V_{BUS\text{-}GEN}$) towards a target bus voltage magnitude $V_{TRGT}$. For example, the target bus voltage magnitude $V_{TRGT}$ may range from a minimum target bus voltage magnitude $V_{TRGT\text{-}MIN}$ (e.g., approximately 17 V) to a maximum target bus voltage magnitude $V_{TRGT\text{-}MAX}$ (e.g., approximately 21 V). As described in more detail herein, the fixture controller 700 may be configured to dynamically control the generated bus voltage magnitude $V_{BUS\text{-}GEN}$ of the bus voltage $V_{BUS}$ across a range. The fixture controller 700 may output the bus voltage $V_{BUS}$ via connectors 730 to a power bus (e.g., the power bus 530) electrically coupled between the fixture controller 700 and one or more lighting modules. The power converter circuit 752 may comprise, for example, a boost converter, a buck converter, a buck-boost converter, a flyback converter, a single-ended primary-inductance converter (SEPIC), a Ćuk converter, and/or any other suitable power converter circuit for generating an appropriate bus voltage. In some examples, the power converter circuit 752 may comprise a controller (e.g., processor) that is internal to the power converter circuit 752 that is configured to control the operation of the power converter circuit 752. The fixture controller 700 may comprise a power supply 748 that may receive the bus voltage $V_{BUS}$ and generate a supply voltage $V_{CC}$ which may be used to power one or more circuits (e.g., low voltage circuits) of the fixture controller 700.

The fixture controller 700 may comprise a fixture control circuit 736. The fixture control circuit 736 may comprise, for example, a microprocessor, a microcontroller, a programmable logic device (PLD), an application specific integrated circuit (ASIC), a field-programmable gate array (FPGA), or any other suitable processing device or controller. The fixture control circuit 736 may be powered by the power supply 748 (e.g., the supply voltage $V_{CC}$). The fixture control circuit 736 may generate a target bus voltage control signal $V_{BUS-CNTL}$ and provide the target bus voltage control signal $V_{BUS-CNTL}$ to cause the power converter circuit 752 to adjust the generated bus voltage magnitude $V_{BUS}$-GEN towards the target bus voltage magnitude $V_{TRGT}$. The fixture controller 700 may comprise a memory 746 configured to store information (e.g., one or more operational characteristics of the fixture controller 700) associated with the fixture controller 700. For example, the memory 746 may be implemented as an external integrated circuit (IC) or as an internal circuit of the fixture control circuit 736.

The fixture controller 700 may include a serial communication circuit 738, which may be configured to communicate on a serial communication bus 740 via connectors 732. For example, the serial communication bus 740 may be an example of the master communication bus 540 (e.g., a wired digital communication link, such as an RS-485 communication link). The serial communication bus 740 may comprise a termination resistor 734, which may be coupled across the lines of the serial communication bus 740. For example, the resistance of the termination resistor 734 may match the differential-mode characteristic impedance of the master communication bus 740 to minimize reflections on the master communication bus 740.

The fixture control circuit 736 may control the serial communication circuit 738 to transmit messages to one or more master lighting modules (e.g., the master lighting modules 200A, the master lighting modules 512, and/or the master lighting module 800) via the serial communication bus 740, for example, to control one or more characteristics of the master lighting modules. For example, the fixture control circuit 736 may transmit control signals to the master lighting modules for controlling the intensity level (e.g., brightness) and/or the color (e.g., color temperature) of light emitted by the master lighting module(s) (e.g., light sources of the master lighting module). Further, the fixture control circuit 736 may be configured to control the operation of drone modules (e.g., middle and/or end drone modules, such as the drone lighting modules 200B, 200C, 200D, 200E, and/or 514) indirectly by communicating messages to the master lighting modules via the serial communication circuit 738 and the serial communication bus 740. For example, the fixture control circuit 736 may control the intensity level and/or the color of light emitted by the drone lighting modules.

The fixture control circuit 736 may receive an input from a line sync circuit 754. The line sync circuit 754 may receive the rectified voltage $V_R$. Alternatively or additionally, the line sync circuit 754 may receive the AC mains line voltage $V_{AC}$ directly from the hot connection H and the neutral connection N. For example, the line sync circuit 754 may comprise a zero-cross detect circuit that may be configured to generate a zero-cross signal $V_{ZC}$ that may indicate the zero-crossings of the AC mains line voltage $V_{AC}$. The fixture control circuit 736 may use the zero-cross signal $V_{ZC}$ from the line sync circuit 754, for example, to generate a synchronization pulse on the master communication bus 740 (e.g., the master communication bus 540), for instance, to synchronize the fixture controller 700 and/or devices controlled by the fixture controller 700 in accordance with the frequency of the AC mains line voltage $V_{AC}$ (e.g., utilizing the timing of the zero crossings of the AC mains line voltage $V_{AC}$).

The fixture control circuit 736 may be configured to generate a synchronization pulse (e.g., a synchronization frame) on the serial communication bus 740. The fixture control circuit 736 may use the zero-cross signal $V_{ZC}$ from the line sync circuit 754, for example, to generate the synchronization pulse on the serial communication bus 740 in accordance with the frequency of the AC mains line voltage $V_{AC}$ (e.g., utilizing the timing of a zero crossing of the AC mains line voltage $V_{AC}$). The synchronization pulse may include either a digital or analog signal. In some examples, the synchronization pulse is a synchronization frame that is generated on the serial communication bus 740. In such examples, the fixture control circuit 736 may be configured to halt transmitting messages on the serial communication bus 740 when generating the synchronization pulse on the serial communication bus 740. As such, the synchronization pulse may be used by the master lighting modules to generate a timing signal that may be used by the master lighting module and the drone lighting modules to coordinate the timing at which the master lighting module and the drone lighting modules can perform a measurement procedure. For example, the synchronization pulse may be generated during a frame sync period that may occur on a periodic basis and during which the synchronization pulse may be generated. Further, as described in more detail herein, the synchronization pulse may be received by the master lighting module(s) connected to the serial communication bus 740, and the master lighting modules may be configured to generate a timing signal that may be received by the drone lighting modules 514 via a separate electrical connection (e.g., the timing signal lines 560).

The fixture control circuit 736 may be configured to receive messages (e.g., one or more signals) from the master lighting modules via the serial communication bus 740. For example, the master lighting modules may transmit feedback information regarding the state of the master lighting modules and/or the drone lighting modules via the serial communication bus 740. The serial communication circuit 738 may receive messages from the master lighting modules, for example, in response to a query transmitted by the fixture control circuit 736.

The fixture controller 700 may comprise a wireless communication circuit 744. The fixture control circuit 736 may be configured to transmit and/or receive messages via the wireless communication circuit 744. The wireless communication circuit 744 may comprise a radio-frequency (RF) transceiver coupled to an antenna 742 for transmitting and/or receiving RF signals. The wireless communication circuit 744 may be an RF transmitter for transmitting RF signals, an RF receiver for receiving RF signals, or an infrared (IR) transmitter and/or receiver for transmitting and/or receiving IR signals. The wireless communication circuit 744 may be configured to transmit and/or receive messages (e.g., via the antenna 742). For example, the wireless communication circuit 744 may transmit messages in response to a signal received from the fixture control circuit 736. The fixture control circuit 736 may be configured to transmit and/or receive, for example, feedback information regarding the status of one or more lighting devices such as the lighting devices 100, 400A, 400B, 400C, 510A, 510B and/or messages including control data and/or commands for controlling one or more lighting devices.

The fixture controller 700 may comprise a voltage feedback circuit 756. The voltage feedback circuit 756 may be coupled across the power bus (e.g., the portion of the power bus 530 that resides within the fixture controller 700) between the output of the power converter circuit 752 and the connectors 730. The voltage feedback circuit 756 may generate a voltage feedback signal $V_{V-FB}$ that indicates the magnitude of the bus voltage $V_{BUS}$, and may provide the voltage feedback signal $V_{V-FB}$ to the fixture control circuit 736. As such, the fixture control circuit 736 may be configured to determine the magnitude of the bus voltage $V_{BUS}$ based on the voltage feedback signal $V_{V-FB}$.

Further, as described in more detail herein, in some examples the fixture control circuit 736 may be configured to detect an overload condition based on the magnitude of the bus voltage $V_{BUS}$ dropping below a threshold voltage (e.g., 15 V) (e.g., and in some instance rises above another threshold voltage, such as 19 V, multiple times). In response to detecting an overload condition, the fixture control circuit 736 may be configured to cause one or more of the lighting modules of the lighting assembly connected to the power bus to reduce their maximum power (e.g., the power delivered to and/or the luminous flux of the light emitted by each of the emitters of the emitter module of each of the one or more lighting modules).

The fixture controller 700 may comprise a current feedback circuit 758. The current feedback circuit 758 may be coupled in series on the power bus (e.g., the portion of the power bus 530 that resides within the fixture controller 700) between the output of the power converter circuit 752 and the connectors 730. The current feedback circuit 758 may generate a current feedback signal $V_{I-FB}$ that indicate the magnitude of a current of a bus current $I_{BUS}$ conducted through the power bus, and may provide the current feedback signal $V_{I-FB}$ to the fixture control circuit 736. As such, the fixture control circuit 736 may be configured to determine the magnitude of the bus current $I_{BUS}$ based on the current feedback signal $V_{I-FB}$.

The fixture controller 700 may be configured to adjust (e.g., dynamically adjust) the generated bus voltage magnitude $V_{BUS-GEN}$ of the bus voltage $V_{BUS}$ generated by the power converter circuit 752 to adjust an end bus voltage magnitude $V_{BUS-END}$ of the bus voltage $V_{BUS}$ as received across the power bus by an end master lighting module. The fixture control circuit 736 may be configured to adjust the target bus voltage magnitude $V_{TRGT}$ (e.g., via the target bus voltage control signal $V_{BUS-CNTL}$) to cause the power converter circuit 752 to adjust the generated bus voltage magnitude $V_{BUS}$-GEN towards the target bus voltage magnitude $V_{TRGT}$. For example, the fixture controller 700 may be configured to adjust the target bus voltage magnitude $V_{TRGT}$ to adjust the end bus voltage magnitude $V_{BUS-END}$ towards a target end bus voltage magnitude $V_{TRGT}$-END. In some examples, the target end bus voltage magnitude $V_{TRGT}$-END may be a constant magnitude, such as 17 V. The target bus voltage magnitude $V_{TRGT}$ of the bus voltage $V_{BUS}$ generated by the power converter circuit 752 may be within a range (e.g., having a magnitude of approximately 17-21 V), such that the end bus voltage magnitude $V_{BUS-END}$ may be controlled to the target end bus voltage magnitude $V_{TRGT-END}$.

The fixture controller 700 may control the end bus voltage magnitude $V_{BUS-END}$ to the target end bus voltage magnitude $V_{TRGT-END}$ independent of the power bus wiring topology (e.g., the length of the wiring of the power bus between the fixture controller and the end master lighting module) to, for example, increase the efficiency of the lighting system across a variety of different power bus wiring topologies. As noted above, the magnitude of the bus voltage $V_{BUS}$ may experience a voltage drop along the power bus due to the resistance of wiring of the power bus and the current drawn by each of the master lighting modules and the drone lighting modules coupled to the power bus. The end bus voltage magnitude $V_{BUS-END}$ may be a function of the voltage drop due to the length of wiring of the power bus as well as the generated bus voltage magnitude $V_{BUS-GEN}$ of the bus voltage $V_{BUS}$ generated by the power converter circuit 752. If the generated bus voltage magnitude $V_{BUS-GEN}$ is reduced (e.g., by reducing the target bus voltage magnitude $V_{TRGT}$ of the power converter circuit 752), then the end bus voltage magnitude $V_{BUS-END}$ may be reduced and the efficiency of the lighting system may be increased (e.g., at least in some power bus wiring topologies).

The fixture control circuit 736 may be configured to adjust the target bus voltage control signal $V_{BUS-CNTL}$ in response to the end bus voltage magnitude $V_{BUS-END}$ of the bus voltage $V_{BUS}$ at the end master lighting module (e.g., a master lighting module 512) along the power bus (e.g., the power bus 530). The end master lighting module may be the master lighting module that is located furthest from the fixture controller 700 along the power bus. The fixture control circuit 736 may receive an indication of the end bus voltage magnitude $V_{BUS-END}$ at the end master lighting module, for example, in one or more messages received from the end master lighting module via the serial communication circuit 738 on the communication bus 740. In some examples, the fixture control circuit 736 may send a request to the end master lighting module (e.g., only the end master lighting module) that prompts the end master lighting module to send the indication of the end bus voltage magnitude $V_{BUS-END}$ to the fixture control circuit 736.

The fixture control circuit 736 may be configured to generate the target bus voltage control signal $V_{BUS-CNTL}$ to control the end bus voltage magnitude $V_{BUS-END}$ towards the target end bus voltage magnitude $V_{TRGT-END}$. The fixture control circuit 736 may be configured to generate the target bus voltage control signal $V_{BUS-CNTL}$ based on the end bus voltage magnitude $V_{BUS-END}$ and the target end bus voltage magnitude $V_{TRGT-END}$ using a digital proportional-integral (PI) controller. For examples, the PI controller may be configured to generate an error value based on the end bus voltage magnitude $V_{BUS-END}$ and the target end bus voltage magnitude $V_{TRGT-END}$, and generate the target bus voltage control signal $V_{BUS-CNTL}$ based on the error value. The power converter circuit 752 may receive the target bus voltage control signal $V_{BUS-CNTL}$ and may adjust the generated bus voltage magnitude $V_{BUS-GEN}$ of the bus voltage $V_{BUS}$ generated by the power converter circuit 752 on the power bus towards the target bus voltage magnitude $V_{TRGT}$ (e.g., which is based on the target bus voltage control signal $V_{BUS-CNTL}$). Accordingly, the fixture controller 700 may be configured to adjust (e.g., dynamically adjust) the generated bus voltage magnitude $V_{BUS-GEN}$ of the bus voltage $V_{BUS}$ generated by the power converter circuit 752 to adjust the end bus voltage magnitude $V_{BUS-END}$ of the bus voltage $V_{BUS}$ across the power bus at the end master module to the target end bus voltage magnitude $V_{TRGT-END}$.

Accordingly, the fixture controller 700 may be configured to manage multiple control loops, such as a first control loop where the power converter circuit 752 is configured to control the generated bus voltage magnitude $V_{BUS-GEN}$ of the bus voltage $V_{BUS}$ as generated by the power converter circuit 752, and a second control loop where the fixture control circuit 736 is configured to control the end bus voltage magnitude $V_{BUS-END}$ of the bus voltage $V_{BUS}$ as received by the end master module to the target end bus voltage magnitude $V_{TRGT-END}$. For instance, the power converter circuit 752 may be configured to adjust the generated bus voltage magnitude $V_{BUS-GEN}$ of the bus voltage $V_{BUS}$ generated by the power converter circuit 752 based on feedback of the generated bus voltage $V_{BUS-GEN}$ generated by the power converter circuit 752 and the target bus voltage control signal $V_{BUS-CNTL}$ (e.g., which indicates the target bus voltage magnitude $V_{TRGT}$). The first control loop may be performed internally within the power converter circuit 752. The second control loop may be performed by the fixture control circuit 736 and the power converter circuit 752. For instance, the fixture control circuit 736 may receive an indication of the end bus voltage magnitude $V_{BUS-END}$ at the end master lighting module, and in response, adjust the target bus voltage magnitude $V_{TRGT}$ of the power converter circuit 752 to attempt to adjust the end bus voltage magnitude $V_{BUS-END}$ of the bus voltage $V_{BUS}$ received by the end master module to the target end bus voltage magnitude $V_{TRGT-END}$ based on the indication of the end bus voltage magnitude $V_{BUS-END}$ at the end master lighting module.

The fixture controller 700 may be configured to manage multiple control loops that operate at different rates. For instance, the power converter circuit 752 may be configured to control the generated bus voltage magnitude $V_{BUS-GEN}$ of the bus voltage $V_{BUS}$ generated by the power converter circuit 752 towards the target bus voltage magnitude $V_{TRGT}$ at a rate that is faster than the fixture control circuit 736 is configured to control the end bus voltage magnitude $V_{BUS-END}$ of the bus voltage $V_{BUS}$ as received by the end master lighting module towards the target end bus voltage magnitude $V_{TRGT-END}$. For example, the power converter circuit 752 may manage the first control loop at a faster rate than the fixture control circuit 736 manages the second control loop. This difference in rates may result in the magnitude of the end bus voltage magnitude $V_{BUS-END}$ dropping below the target end bus voltage magnitude $V_{TRGT-END}$ in response to a large increase in current drawn by the lighting modules, which in turn may cause a brownout event to occur before the second control loop has time to increase the end bus voltage magnitude $V_{BUS-END}$ back above the target end bus voltage magnitude $V_{TRGT-END}$.

Controlling the end bus voltage magnitude $V_{BUS-END}$ towards the target end bus voltage magnitude $V_{TRGT-END}$ that is less than the maximum target bus voltage magnitude $V_{TRGT-MAX}$ could lead to instances where the end master lighting module experiences a brownout event (e.g., due to the end bus voltage magnitude $V_{BUS-END}$ dropping too low). A brownout event may occur when the magnitude of the bus current $I_{BUS}$ increases such as when the intensity levels of one or more of the lighting modules are increasing). Accordingly, the fixture control circuit 736 may be configured with a pre-brownout threshold $V_{TH-BO}$ to (e.g., approximately 15.5 V) prevent the occurrence of a brownout event on the power bus. For example, the fixture control circuit 736 may determine that the end bus voltage magnitude $V_{BUS-END}$ has dropped below a pre-brownout threshold $V_{TH-BO}$, and in response, may control the target bus voltage magnitude $V_{TRGT}$ (e.g., as indicated by the target bus voltage control signal $V_{BUS-CNTL}$) to be equal to the maximum target voltage magnitude $V_{TRGT-MAX}$. In some examples, the fixture control circuit 736 may control the target bus voltage magnitude $V_{TRGT}$ to the maximum target bus voltage magnitude $V_{TRGT-MAX}$ for a predetermined period of time (e.g., approximately 3 seconds) after determining that the end bus voltage magnitude $V_{BUS-END}$ has dropped below the pre-brownout threshold $V_{TH-BO}$. At the expiration of the predetermined period of time, the fixture control circuit 736 may be configured to control the target bus voltage magnitude $V_{TRGT}$ based on the end bus voltage magnitude $V_{BUS-END}$ (e.g., and the target end bus voltage magnitude $V_{TRGT-END}$). For example, at the expiration of the predetermined period of time, the fixture control circuit 736 may be configured to control the target bus voltage magnitude $V_{TRGT}$ to be less than the maximum target voltage magnitude $V_{TRGT-MAX}$.

The target bus voltage magnitude $V_{TRGT}$ (e.g., as indicated by the target bus voltage control signal $V_{BUS-CNTL}$) may range from the minimum target bus voltage magnitude $V_{TRGT-MIN}$ to the maximum target bus voltage magnitude $V_{TRGT-MAX}$. The target bus voltage control signal $V_{BUS-CNTL}$ may cause the power converter circuit 752 to generate the bus voltage $V_{BUS}$ at a magnitude across a range between the minimum target bus voltage magnitude $V_{TRGT-MIN}$ (e.g., approximately 17V) and the maximum target bus voltage magnitude $V_{TRGT-MAX}$ (e.g., approximately 21V). The pre-brownout threshold $V_{TH-BO}$ may be below the minimum target bus voltage magnitude $V_{TRGT-MIN}$, but greater than the magnitude of the bus voltage $V_{BUS}$ that may cause a brownout condition (e.g., approximately 15 volts).

Figure 8:
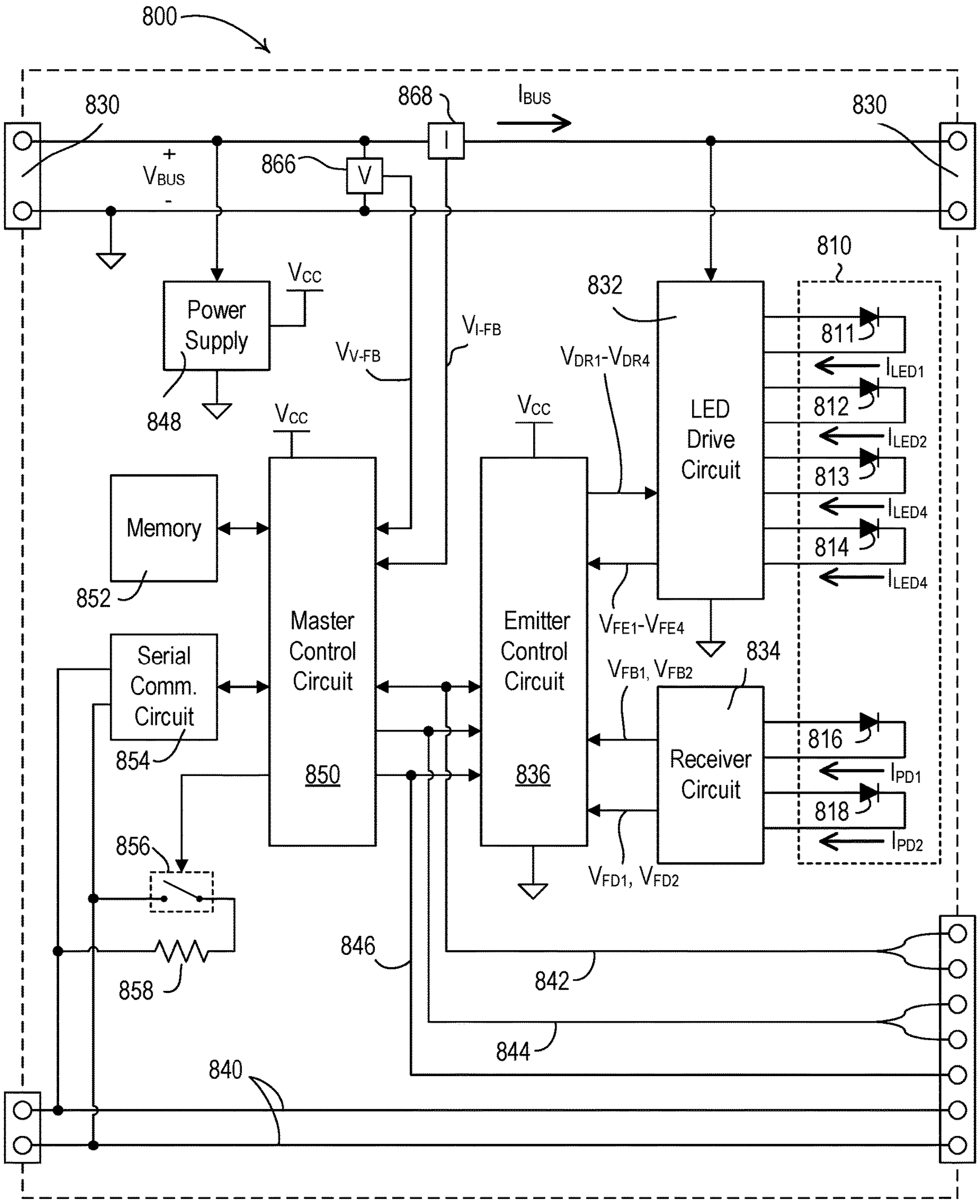
FIG. 8 is a simplified block diagram of an example master emitter module.

FIG. 8 is a simplified block diagram of an example master lighting module 800 (e.g., a starter module such as the master modules 150A, 200A, and/or 512) of a lighting device (e.g., such as the lighting device 100 shown in FIGS. 1, 2 the lighting devices 400A, 400B, 400C shown in FIG. 5, and/or the lighting devices 510A, 510B shown in FIG. 6) of a lighting system (e.g., the lighting system 500 shown in FIG. 6). Each lighting device of the lighting system may include a master lighting module 800 and one or more drone lighting modules (e.g., the drone modules 150B, 150C, 200B-200E, 514). The master lighting module 800 may be the first module of the lighting device. That is, when reviewing the physical order of the master and drone lighting modules of a lighting device, the master lighting module 800 may be the first lighting module to receive the bus voltage. Alternatively, in other examples, one or more drone lighting modules may be the first module of the lighting device (e.g., the drone lighting modules may receive the bus voltage prior to the master lighting module 800).

The master lighting module 800 may comprise one or more emitter modules 810 (e.g., the emitter modules 154, 210, and/or 300), where each emitter module 810 may include one or more strings of emitters 811, 812, 813, 814. Although each of the emitters 811, 812, 813, 814 is shown in FIG. 8 as a single LED, each of the emitters 811, 812, 813, 814 may comprise a plurality of LEDs connected in series (e.g., a chain of LEDs), a plurality of LEDs connected in parallel, or a suitable combination thereof, depending on the particular lighting system. In addition, each of the emitters 811, 812, 813, 814 may comprise one or more organic light-emitting diodes (OLEDs). For example, the first emitter 811 may represent a chain of red LEDs, the second emitter 812 may represent a chain of blue LEDs, the third emitter 813 may represent a chain of green LEDs, and the fourth emitter 814 may represent a chain of white or amber LEDs.

The master lighting module 800 may control the emitters 811, 812, 813, 814 to adjust an intensity level (e.g., a luminous flux or a brightness) and/or a color (e.g., a color temperature) of a cumulative light output of the master lighting module 800. The emitter module 810 may also comprise one or more detectors 816, 818 (e.g., the detectors 312) that may generate respective detector signals (e.g., photodiode currents $I_{PD1}$, $I_{PD2}$) in response to incident light. In examples, the detectors 816, 818 may be photodiodes. For example, the first detector 816 may represent a single red, orange or yellow LED, or multiple red, orange or yellow LEDs in parallel, and the second detector 818 may represent a single green LED or multiple green LEDs in parallel.

The master lighting module 800 may comprise a power supply 848 that may receive a source voltage, such as a bus voltage (e.g., the bus voltage $V_{BUS}$ on the power bus 530), via a first connector 830. The power supply 848 may generate an internal DC supply voltage $V_{CC}$ which may be used to power one or more circuits (e.g., low voltage circuits) of the master lighting module 800.

The master lighting module 800 may comprise an LED drive circuit 832. The LED drive circuit 832 may be configured to control (e.g., individually control) the power delivered to and/or the luminous flux of the light emitted by each of the emitters 811, 812, 813, 814 of the emitter module 810. The LED drive circuit 832 may receive the bus voltage $V_{BUS}$ and may adjust magnitudes of respective LED drive currents $I_{LED1}$, $I_{LED2}$, $I_{LED3}$, $I_{LED4}$ conducted through the emitters 811, 812, 813, 814. The LED drive circuit 832 may comprise one or more regulation circuits (e.g., four regulation circuits), such as switching regulators (e.g., buck converters) for controlling the magnitudes of the respective LED drive currents $I_{LED1}$-$I_{LED4}$. An example of the LED drive circuit 832 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The master lighting module 800 may comprise a receiver circuit 834 that may be electrically coupled to the detectors 816, 818 of the emitter module 810 for generating respective optical feedback signals $V_{FB1}$, $V_{FB2}$ in response to the photodiode currents $I_{PD1}$, $I_{PD2}$. The receiver circuit 834 may comprise one or more trans-impedance amplifiers (e.g., two trans impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The master lighting module 800 may comprise an emitter control circuit 836 for controlling the LED drive circuit 832 to control the intensities and/or colors of the emitters 811, 812, 813, 814 of the emitter module 810. The emitter control circuit 836 may comprise, for example, a microprocessor, a microcontroller, a programmable logic device (PLD), an application specific integrated circuit (ASIC), a field-programmable gate array (FPGA), or any other suitable processing device or controller. The emitter control circuit 836 may be powered by the power supply 848 (e.g., receiving the voltage $V_{CC}$). The emitter control circuit 836 may generate one or more drive signals $V_{DR1}$, $V_{DR2}$, $V_{DR3}$, $V_{DR4}$ for controlling the respective regulation circuits in the LED drive circuit 832. The emitter control circuit 836 may receive the optical feedback signals $V_{FB1}$, $V_{FB2}$ from the receiver circuit 834 for determining the luminous flux $L_E$ of the light emitted by the emitters 811, 812, 813, 814.

The emitter control circuit 836 may receive a plurality of emitter forward voltage feedback signals $V_{FE1}$, $V_{FE2}$, $V_{FE3}$, $V_{FE4}$ from the LED drive circuit 832 and a plurality of detector forward voltage feedback signals $V_{FD1}$, $V_{FD2}$ from the receiver circuit 834. The emitter forward voltage feedback signals $V_{FE1}$-$V_{FE4}$ may be representative of the magnitudes of the forward voltages of the respective emitters 811, 812, 813, 814, which may indicate temperatures $T_{E1}$, $T_{E2}$, $T_{E3}$, $T_{E4}$ of the respective emitters. If each emitter 811, 812, 813, 814 comprises multiple LEDs electrically coupled in series, the emitter forward voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward voltage feedback signals $V_{FD1}$, $V_{FD2}$ may be representative of the magnitudes of the forward voltages of the respective detectors 816, 818, which may indicate temperatures $T_{D1}$, $T_{D2}$ of the respective detectors. For example, the detector forward voltage feedback signals $V_{FD1}$, $V_{FD2}$ may be equal to the forward voltages $V_{FD}$ of the respective detectors 816, 818.

The master lighting module 800 may comprise a master control circuit 850. The master control circuit 850 may comprise, for example, a microprocessor, a microcontroller, a programmable logic device (PLD), an application specific integrated circuit (ASIC), a field-programmable gate array (FPGA), or any other suitable processing device or controller. The master control circuit 850 may be electrically coupled to a fixture controller (e.g., the fixture controllers 520, 700) via a communication bus 840 (e.g., a master communication bus, such as an RS-485 communication link). The master control circuit 850 may be electrically coupled to the drone lighting modules via one or more electrical connections, such as a communication bus 842 (e.g., a drone communication bus, such as an $I^2C$ communication link), a timing signal lines 844, and/or an IRQ signal line 846. The master control circuit 850 may be powered by the power supply 848 (e.g., receiving the voltage $V_{CC}$).

The master lighting module 800 may comprise a serial communication circuit 854 that couples the master control circuit 850 to the communication bus 840. The serial communication circuit 854 may be configured to communicate with the fixture controller on the communication bus 840. For example, the communication bus 840 may be an example of the communication bus 540 and/or the communication bus 740. The master lighting module 800 may comprise a termination resistor 858 coupled in series with a controllable switching circuit 856 between the lines of the communication bus 840. For example, the resistance of the termination resistor 858 may match the differential-mode characteristic impedance of the master communication bus 840 to minimize reflections on the communication bus 840. The master control circuit 850 may be configured to control the controllable switching circuit 856 to control when the termination resistor 858 is coupled between the lines of the communication bus 840. For example, if the master lighting module 800 is an end master lighting module (e.g., if the master lighting module is the farthest from the fixture controller of the lighting system), the master control circuit 850 may be configured to render the controllable switching circuit 856 conductive to electrically couple the termination resistor 858 between the lines of the communication bus 840.

The master control circuit 850 be configured to determine the target intensity level $L_{TRGT}$ for the master lighting module 800 and/or one or more drone lighting modules in response to messages received via the serial communication circuit 854 (e.g., via the communication bus 840 from the fixture controller). For example, the master control circuit 850 may be configured to control the emitter control circuit 836 to control the intensity level (e.g., brightness or luminous flux) and/or the color (e.g., color temperature) of the cumulative light emitted by the emitter module 810 of the master lighting module 800, for example, in response to messages received via the communication bus 840. That is, the master control circuit 850 may be configured to control the emitter control circuit 836, for example, to control the LED drive circuit 832 and the emitter module 810.

The master control circuit 850 may be configured to communicate with the one or more drone lighting modules via the communication bus 842 (e.g., using the $I^2C$ communication protocol). The communication bus 842 may be, for example, the drone communication bus 550. For example, the master control circuit 850 may be configured to transmit messages including control data and/or commands to the drone lighting modules via the communication bus 842 to control the emitter modules of one or more drone lighting modules to control the intensity level (e.g., brightness or luminous flux) and/or the color (e.g., color temperature) of the cumulative light emitted by the emitter modules of the drone lighting modules, for example, in response to messages received via the communication bus 840.

The master control circuit 850 may be configured to adjust a present intensity level $L_{PRES}$ (e.g., a present brightness) of the cumulative light emitted by the master lighting module 800 and/or drone lighting modules towards a target intensity level $L_{TRGT}$ (e.g., a target brightness). The target intensity level $L_{TRGT}$ may be in a range across a dimming range, e.g., between a low-end intensity level $L_{LE}$ (e.g., a minimum intensity level, such as approximately 0.1%-1.0%) and a high-end intensity level $L_{HE}$ (e.g., a maximum intensity level, such as approximately 100%). The master lighting module 800 (e.g., and/or the drone lighting modules) may be configured to adjust a present color temperature $T_{PRES}$ of the cumulative light emitted by the master lighting module 800 (e.g., and/or the drone lighting modules) towards a target color temperature $T_{TRGT}$. In some examples, the target color temperature $T_{TRGT}$ may be in a range between a cool-white color temperature (e.g., approximately 3100-4500 K) and a warm-white color temperature (e.g., approximately 2000-3000 K).

In examples, the master control circuit 850 may receive a synchronization pulse on the communication bus 840 (e.g., from the fixture controller 700). The synchronization pulse may include either a digital or analog signal. In some examples, the synchronization pulse is a sync frame that is generated on the communication bus 840. In such examples, the master control circuit 850 may be configured to not transmit messages with the fixture controller on the communication bus 840 during a frame sync period when the synchronization pulse may be received. As such, the synchronization pulse may be used by the master control circuit 850 to generate a timing signal that may be used by the master lighting module and the drone lighting modules to coordinate the timing at which the master lighting module 800 and the drone lighting modules can perform a measurement procedure. For example, the synchronization pulse may be generated during a frame sync period that may occur on a periodic basis and during which the synchronization pulse may be generated.

The master control circuit 850 may be configured to generate a timing signal, for example, on the timing signal lines 844 (e.g., the timing signal lines 560). The master control circuit 850 may be configured to generate the timing signal in response to the synchronization pulse. In some examples, the timing signal may be a sinusoidal waveform that is generated at a frequency that is determined based on the frequency of synchronization pulse received from the fixture controller. The emitter control circuit 836 of the master lighting module 800 and emitter module control circuits of the drone lighting modules (e.g., the drone lighting modules connected to the communication bus 844) may receive the timing signal generated by the master control circuit 850. As noted herein, the master lighting module 800 and the drone lighting modules may use the timing signal to coordinate a timing at which the master lighting module 800 and the drone lighting modules 514 can perform the measurement procedure (e.g., to reduce the likelihood that any module causes interference with the measurement procedure of another module). For example, the master lighting module 800 and the drone lighting modules may use the timing signal to determine a time to measure optical feedback information of the lighting loads of its module to, for example, perform color and/or intensity level control refinement, when other master and drone lighting modules are not emitting light.

The master control circuit 850 may also be configured to receive an indication from the emitter control circuit 836 and/or an emitter control circuit of one of the drone lighting modules requires service and/or has a message to transmit to the master lighting module 800 via the IRQ signal line 846 (e.g., such as the IRQ signal line 570 shown in FIG. 6). In examples, an emitter control circuit may signal to the master control circuit 850 via the IRQ signal line 846 that the emitter control circuit needs to be serviced. In addition, an emitter control circuit may signal to the master control circuit 850 via the IRQ signal line 846 that the emitter control circuit has a message to transmit to the master control circuit 850. Further, the master control circuit 850 may be configured to determine the order and/or location of each drone lighting module using the IRQ signal line 846.

The master lighting module 800 may comprise a memory 852 configured to store information (e.g., one or more operational characteristics of the master lighting module 800 such as the target intensity level $L_{TRGT}$, the target color temperature $T_{TRGT}$, the low-end intensity level $L_{LE}$, the high-end intensity level $L_{HE}$, and/or the like). The memory 852 may be implemented as an external integrated circuit (IC) or as an internal circuit of the master control circuit 850.

When the master lighting module 800 is powered on, the master control circuit 850 may be configured to control the master lighting module 800 (e.g., the emitters of the master lighting module 800) to emit light substantially all of the time. The emitter control circuit 836 may be configured to disrupt the normal emission of light to execute the measurement procedure during periodic measurement intervals. During the periodic measurement intervals, the emitter control circuit 836 may measure one or more operational characteristics of the master lighting module 800. The measurement intervals may occur based on the timing signal on the synchronization lines 844 (e.g., which may be based on zero-crossing events of the AC mains line voltage $V_{AC}$). The emitter control circuit 836 may be configured to receive the timing signal and determine the specific timing of the periodic measurement intervals (e.g., a frequency of a periodic measurement intervals) based on (e.g., in response to) the timing signal. For example, during the measurement intervals, the emitter control circuit 836 may be configured to individually turn on each of the different-colored emitters 811, 812, 813, 814 of the master lighting module 800 (e.g., while turning off the other emitters) and measure the luminous flux of the light emitted by that emitter using one of the two detectors 816, 818. For example, the emitter control circuit 836 may turn on the first emitter 811 of the emitter module 810 (e.g., at the same time as turning off the other emitters 812, 813, 814) and determine the luminous flux $L_E$ of the light emitted by the first emitter 811 in response to the first optical feedback signal $V_{FB1}$ generated from the first detector 816. In addition, the emitter control circuit 836 may be configured to drive the emitters 811, 812, 813, 814 and the detectors 816, 818 to generate the emitter forward voltage feedback signals $V_{FE1}$-$V_{FE4}$ and the detector forward voltage feedback signals $V_{FD1}$, $V_{FD2}$ during the measurement intervals.

Methods of measuring the operational characteristics of emitter modules in a lighting device are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES; U.S. Pat. No. 9,392,660, issued Jul. 12, 2016, entitled LED ILLUMINATION DEVICE AND CALIBRATION METHOD FOR ACCURATELY CHARACTERIZING THE EMISSION LEDS AND PHOTODETECTOR(S) INCLUDED WITHIN THE LED ILLUMINATION DEVICE; and U.S. Pat. No. 9,392,663, issued Jul. 12, 2016, entitled ILLUMINATION DEVICE AND METHOD FOR CONTROLLING AN ILLUMINATION DEVICE OVER CHANGES IN DRIVE CURRENT AND TEMPERATURE, the entire disclosures of which are hereby incorporated by reference.

Calibration values for the various operational characteristics of the master lighting module 800 may be stored in the memory 852 as part of a calibration procedure performed during manufacturing of the master lighting module 800. Calibration values may be stored for each of the emitters 811, 812, 813, 814 and/or the detectors 816, 818 of the emitter module 800. For example, calibration values may be stored for measured values of luminous flux (e.g., in lumens), x-chromaticity, y-chromaticity, emitter forward voltage, photodiode current, and/or detector forward voltage. For example, the luminous flux, x-chromaticity, and/or y-chromaticity measurements may be obtained from the emitters 811, 812, 813, 814 using an external calibration tool, such as a spectrophotometer. In examples, the master lighting module 800 may measure the values for the emitter forward voltages, photodiode currents, and/or detector forward voltages internally. An external calibration tool and/or the master lighting module 800 may measure the calibration values for each of the emitters 811, 812, 813, 814 and/or the detectors 816, 818 at a plurality of different drive currents, and/or at a plurality of different operating temperatures.

After installation, the master lighting module 800 of the lighting device may use the calibration values stored in the memory 852 to maintain a constant light output from the master lighting module 800. The master control circuit 850 may determine target values for the luminous flux to be emitted from the emitters 811, 812, 813, 814 to achieve the target intensity level $L_{TRGT}$ and/or the target color temperature $T_{TRGT}$ for the master lighting module 800. The emitter control circuit 836 may determine the magnitudes for the respective drive currents $I_{LED1}$-$I_{LED4}$ for the emitters 811, 812, 813, 814 based on the determined target values for the luminous flux to be emitted from the emitters 811, 812, 813, 814. When the age of the master lighting module 800 is zero, the magnitudes of the respective drive currents $I_{LED1}$-$I_{LED4}$ for the emitters 811, 812, 813, 814 may be controlled to initial magnitudes $I_{LED-INITIAL}$.

The light output (e.g., a maximum light output and/or the light output at a specific current or frequency) of the master lighting module 800 may decrease as the emitters 811, 812, 813, 814 age. The emitter control circuit 836 may be configured to increase the magnitudes of the drive current IDR for the emitters 811, 812, 813, 814 to adjusted magnitudes $I_{LED-ADJUSTED}$ to achieve the determined target values for the luminous flux of the target intensity level $L_{TRGT}$ and/or the target color temperature $T_{TRGT}$. Methods of adjusting the drive currents of emitters to achieve a constant light output as the emitters age are described in greater detail in U.S. Pat. No. 9,769,899, issued Sep. 19, 2017, entitled ILLUMINATION DEVICE AND AGE COMPENSATION METHOD, the entire disclosure of which is hereby incorporated by reference.

Further, in some examples, the master lighting module 800 may comprise a voltage feedback circuit 866. The voltage feedback circuit 866 may be coupled across the power bus (e.g., the portion of the power bus 530 that resides within master lighting module 800) between the connectors 830. The voltage feedback circuit 866 may generate a voltage feedback signal $V_{V-FB}$ that indicate the magnitude of the voltage of the bus voltage $V_{BUS}$, and may provide the voltage feedback signal $V_{V-FB}$ to the master control circuit 850. As such, the master control circuit 850 may be configured to determine the magnitude of the bus voltage $V_{BUS}$ based on the voltage feedback signal $V_{V-FB}$. As noted in more detail below, in some examples, if the master control circuit 850 detects that the magnitude of the bus voltage $V_{BUS}$ falls below a threshold voltage (e.g., 15 V), the master control circuit 850 may be configured to cause the emitters 811, 812, 813, 814 of the master lighting module 800 to turn off (e.g., control the power delivered to and/or the luminous flux of the light emitted by each of the emitters 811, 812, 813, 814 of the emitter module 810 to zero). The master control circuit 850 may turn off the emitters 811, 812, 813, 814 when the magnitude of the bus voltage $V_{BUS}$ falls below the threshold voltage to, for example, ensure that the control circuits and communication circuitry (e.g., the master control circuit 850, the emitter control circuit 836, and/or the serial communication circuit 854) of the master lighting module 800 remains powered. Further, although described in reference to the master control circuit 850, in some examples the emitter control circuit 836 may receive the voltage feedback signal $V_{V-FB}$ and control the emitters 811, 812, 813, 814 accordingly.

The master control circuit 850 may be configured to determine the magnitude of the bus voltage $V_{BUS}$ as received by the master lighting module 800 based on the voltage feedback signal $V_{V-FB}$ and then transmit an indication of the magnitude of the bus voltage $V_{BUS}$ as received by the master lighting module 800 to the fixture controller (e.g., the fixture controller 700) via the serial communication circuit 854. In some examples, the fixture controller may send a request to the master control circuit 850 (e.g., via serial communication circuit 854) that prompts the master control circuit 850 to send to the fixture controller the indication of the magnitude of the end bus voltage $V_{BUS}$ as received by the master lighting module 800. Accordingly, the fixture controller may receive an indication of the magnitude of the bus voltage $V_{BUS}$ as received by the master lighting module 800.

The master lighting module 800 may comprise a current feedback circuit 868. The current feedback circuit 868 may be coupled in series on the power bus (e.g., the portion of the power bus 530 that resides within the master lighting module 800) between the connectors 830. The current feedback circuit 868 may generate a current feedback signal $V_{I-FB}$ that indicate the magnitude of a current of a bus current $I_{BUS}$, and may provide the current feedback signal $V_{I-FB}$ to the master control circuit 850. As such, the master control circuit 850 may be configured to determine the magnitude of the bus current $I_{BUS}$ based on the current feedback signal $V_{I-FB}$. Further, although described in reference to the master control circuit 850, in some examples the emitter control circuit 836 may receive the current feedback signal $V_{I-FB}$.

Figure 9:
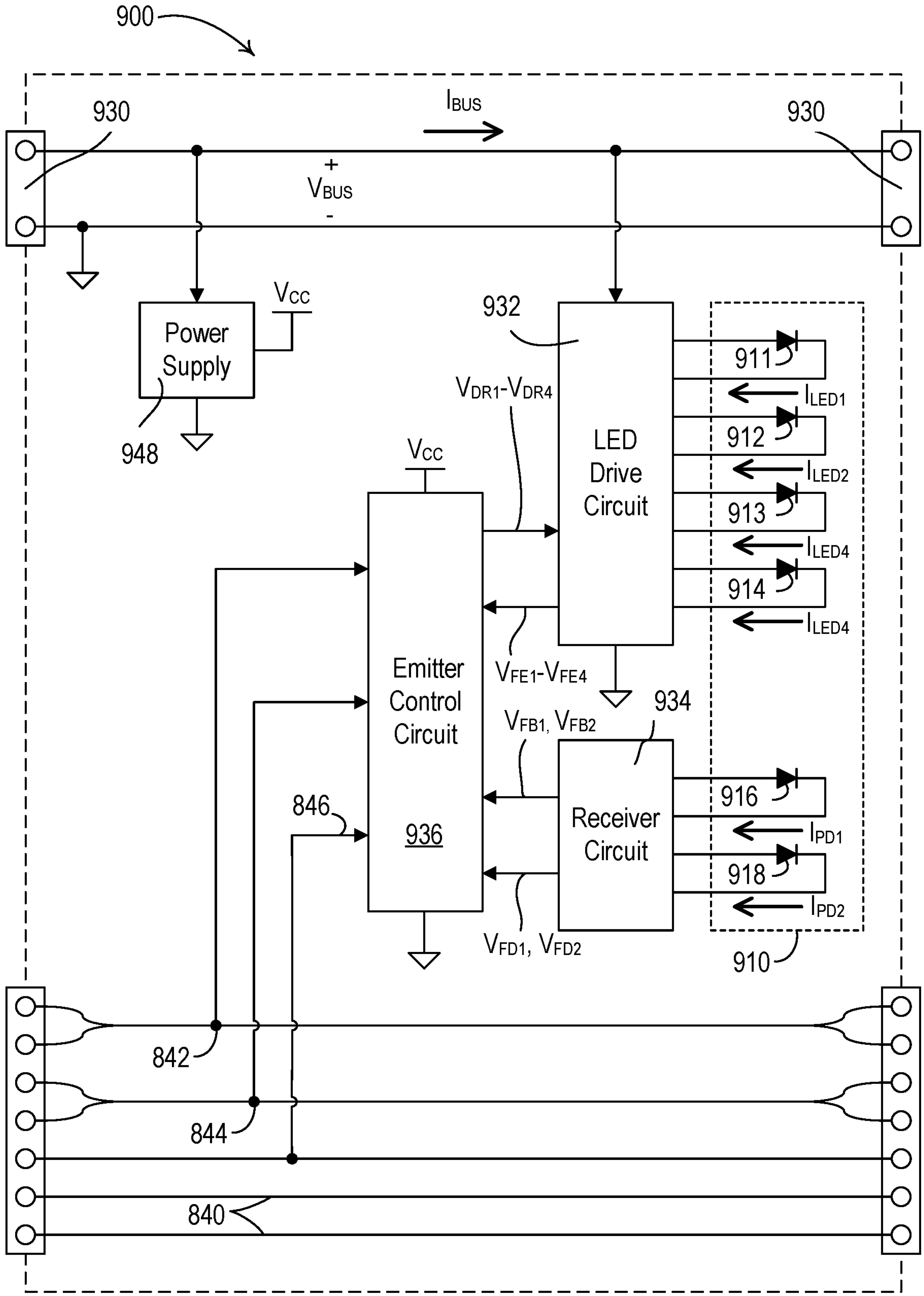
FIG. 9 is a simplified block diagram of an example middle emitter module.

FIG. 9 is a simplified block diagram of an example drone lighting module 900 (e.g., a middle drone lighting module such as middle drone lighting modules 150B, 200B, and/or 200C shown in FIGS. 2, 3B, and 3C) of a lighting device (e.g., such as the lighting device 100 shown in FIGS. 1, 2 the lighting devices 400A, 400B, 400C shown in FIG. 5, and/or the lighting devices 510A, 510B shown in FIG. 6) of a lighting system (e.g., the lighting system 500 shown in FIG. 6). The middle drone lighting module 900 may be a middle module of the lighting device. The middle drone lighting module 900 may include any drone lighting module that resides between the master lighting module (e.g., the master module 150A, 200A, 512, and/or the master lighting module 800) and another drone lighting module of the lighting device.

The middle drone lighting module 900 may comprise one or more emitter modules 910 (e.g., such as the emitter modules 154, 210, and/or 300). For example, the middle drone lighting module 900 may comprise an emitter module 910 that may include one or more strings of emitters 911, 912, 913, 914. Each of the emitters 911, 912, 913, 914 is shown in FIG. 9 as a single LED, but may each comprise a plurality of LEDs connected in series (e.g., a chain of LEDs), a plurality of LEDs connected in parallel, or a suitable combination thereof, depending on the particular lighting system. In addition, each of the emitters 911, 912, 913, 914 may comprise one or more organic light-emitting diodes (OLEDs). For example, the first emitter 911 may represent a chain of red LEDs, the second emitter 912 may represent a chain of blue LEDs, the third emitter 913 may represent a chain of green LEDs, and the fourth emitter 914 may represent a chain of white or amber LEDs.

The middle drone lighting module 900 may control the emitters 911, 912, 913, 914 to adjust an intensity level (e.g., a luminous flux or a brightness) and/or a color (e.g., a color temperature) of a cumulative light output of the middle drone lighting module 900. The emitter module 910 may also comprise one or more detectors 916, 918 (e.g., the detectors 312) that may generate respective photodiode currents $I_{PD1}$, $I_{PD2}$ (e.g., detector signals) in response to incident light. In examples, the detectors 916, 918 may be photodiodes. For example, the first detector 916 may represent a single red, orange or yellow LED or multiple red, orange or yellow LEDs in parallel, and the second detector 918 may represent a single green LED or multiple green LEDs in parallel.

The middle drone lighting module 900 may comprise a power supply 948 that may receive a source voltage, such as a bus voltage (e.g., the bus voltage $V_{BUS}$ on the power bus 530), via a first connector 930. The power supply 948 may generate an internal DC supply voltage $V_{CC}$ which may be used to power one or more circuits (e.g., low voltage circuits) of the middle drone lighting module 900, such as the emitter control circuit 936.

The middle drone lighting module 900 may comprise an LED drive circuit 932. The LED drive circuit 932 may be configured to control (e.g., individually controlling) the power delivered to and/or the luminous flux of the light emitted by each of the emitters 911, 912, 913, 914 of the emitter module 910. The LED drive circuit 932 may receive the bus voltage $V_{BUS}$ and may adjust magnitudes of respective LED drive currents $I_{LED1}$, $I_{LED2}$, $I_{LED3}$, $I_{LED4}$ conducted through the emitters 911, 912, 913, 914. The LED drive circuit 932 may comprise one or more regulation circuits (e.g., four regulation circuits), such as switching regulators (e.g., buck converters) for controlling the magnitudes of the respective LED drive currents $I_{LED1}$-$I_{LED4}$.

The middle drone lighting module 900 may comprise a receiver circuit 934 that may be electrically coupled to the detectors 916, 918 of the emitter module 910 for generating respective optical feedback signals $V_{FB1}$, $V_{FB2}$ in response to the photodiode currents $I_{PD1}$, $I_{PD2}$. The receiver circuit 934 may comprise one or more trans-impedance amplifiers (e.g., two trans impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The middle drone lighting module 900 may comprise an emitter control circuit 936 for controlling the LED drive circuit 932 to control the intensities and/or colors of the emitters 911, 912, 913, 914 of the emitter module 910. The emitter control circuit 936 may comprise, for example, a microprocessor, a microcontroller, a programmable logic device (PLD), an application specific integrated circuit (ASIC), a field-programmable gate array (FPGA), or any other suitable processing device or controller. The emitter control circuit 936 may be electrically coupled to a master lighting module via one or more electrical connections, such as the communication bus 842 (e.g., a drone communication bus, such as an $I^2C$ communication link), the timing signal line 844, and/or the IRQ signal line 846.

The emitter control circuit 936 may be configured to communicate with a master lighting module via the communication bus 842 (e.g., using the $I^2C$ communication protocol). The communication bus 842 may be, for example, the drone communication bus 550. For example, the emitter control circuit 936 may be configured to receive messages including control data and/or commands from the master lighting module via the communication bus 842 to control the emitter modules 910 to control the intensity level (e.g., brightness or luminous flux) and/or the color (e.g., color temperature) of the cumulative light emitted by the emitter modules 910 of the middle drone lighting module 900.

The emitter control circuit 936 may be powered by the power supply 948 (e.g., receiving the voltage $V_{CC}$). The emitter control circuit 936 may generate one or more drive signals $V_{DR1}$, $V_{DR2}$, $V_{DR3}$, $V_{DR4}$ for controlling the respective regulation circuits in the LED drive circuit 932. The emitter control circuit 936 may receive the optical feedback signals $V_{FB1}$, $V_{FB2}$ from the receiver circuit 934 for determining the luminous flux $L_E$ of the light emitted by the emitters 911, 912, 913, 914.

The emitter control circuit 936 may be configured to transmit an indication to the master control circuit 850 when the emitter control circuit 936 requires service and/or has a message to transmit to the master lighting module 800 via the IRQ signal line 846 (e.g., such as the IRQ signal line 570 shown in FIG. 6). For example, the emitter control circuit 936 may signal the master control circuit (e.g., the master control circuit 850) via the IRQ signal line 846 that the emitter control circuit 936 needs to be serviced. In addition, the emitter control circuit 936 may signal to the master control circuit via the IRQ signal line 846 that the emitter control circuit 936 has a message to transmit to the master control circuit.

The emitter control circuit 936 may receive a plurality of emitter forward voltage feedback signals $V_{FE1}$, $V_{FE2}$, $V_{FE3}$, $V_{FE4}$ from the LED drive circuit 932 and a plurality of detector forward voltage feedback signals $V_{FD1}$, $V_{FD2}$ from the receiver circuit 934. The emitter forward voltage feedback signals $V_{FE1}$-$V_{FE4}$ may be representative of the magnitudes of the forward voltages of the respective emitters 911, 912, 913, 914, which may indicate temperatures $T_{E1}$, $T_{E2}$, $T_{E3}$, $T_{E4}$ of the respective emitters. If each emitter 911, 912, 913, 914 comprises multiple LEDs electrically coupled in series, the emitter forward voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward voltage feedback signals $V_{FD1}$, $V_{FD2}$ may be representative of the magnitudes of the forward voltages of the respective detectors 916, 918, which may indicate temperatures $T_{D1}$, $T_{D2}$ of the respective detectors. For example, the detector forward voltage feedback signals $V_{FD1}$, $V_{FD2}$ may be equal to the forward voltages $V_{FD}$ of the respective detectors 916, 918.

Notably, the middle drone lighting module 900 is not connected to the communication bus 840 (e.g., an RS-485 communication link). Accordingly, the emitter control circuit 936 of the middle drone lighting module 900 may receive messages (e.g., control messages) via a communication bus 842 (e.g., using the $I^2C$ communication protocol). For example, the middle drone lighting module 900 may receive messages from a master lighting module (e.g., the master module 150A, 200A, 512, and/or the master lighting module 800). A master control circuit of the master lighting module (e.g., master control circuit 850) may be configured to control the middle drone lighting module 900 to control the intensity level (e.g., brightness or luminous flux) and/or the color (e.g., color temperature) of the cumulative light emitted by the middle drone lighting module 900.

The master control circuit may be configured to adjust a present intensity level $L_{PRES}$ (e.g., a present brightness) of the cumulative light emitted by the middle drone lighting module 900 towards a target intensity level $L_{TRGT}$ (e.g., a target brightness). The target intensity level $L_{TRGT}$ may be in a range across a dimming range of the middle drone lighting module 900, e.g., between a low-end intensity level $L_{LE}$ (e.g., a minimum intensity level, such as approximately 0.1%-1.0%) and a high-end intensity level $L_{HE}$ (e.g., a maximum intensity level, such as approximately 100%). The master control circuit may be configured to adjust a present color temperature $T_{PRES}$ of the cumulative light emitted by the middle drone lighting module 900 towards a target color temperature $T_{TRGT}$. In some examples, the target color temperature $T_{TRGT}$ may range be in a range between a cool-white color temperature (e.g., approximately 3100-4500 K) and a warm-white color temperature (e.g., approximately 2000-3000 K).

When the middle drone lighting module 900 is powered on, the master control circuit may be configured to control the middle drone lighting module 900 (e.g., the emitters of the middle drone lighting module 900) to emit light substantially all of the time. The emitter control circuit 936 may be configured to receive a timing signal (e.g., via the timing signal lines 844 and/or an IRQ signal line 846). The emitter control circuit 936 may use the timing signal to coordinate the timing at which the emitter control circuit 936 can perform a measurement procedure (e.g., to reduce the likelihood that any module causes interference with the measurement procedure of another module). For example, the emitter control circuit 936 may use the timing signal to determine a time to measure optical feedback information of the lighting loads of its module to, for example, perform color and/or intensity level control refinement, when other master and drone lighting modules are not emitting light.

The emitter control circuit 936 may be configured to disrupt the normal emission of light to execute the measurement procedure during periodic measurement intervals. During the periodic measurement intervals, the emitter control circuit 936 may measure one or more operational characteristics of the middle drone lighting module 900. The measurement intervals may occur based on the timing signal on the synchronization lines 844 (e.g., which may be based on zero-crossing events of the AC mains line voltage $V_{AC}$). The emitter control circuit 936 may be configured to receive the timing signal and determine the specific timing of the periodic measurement intervals (e.g., a frequency of periodic measurement intervals) based on (e.g., in response to the timing signal. For example, during the measurement intervals, the emitter control circuit 936 may be configured to individually turn on each of the different-colored emitters 911, 912, 913, 914 of the middle drone lighting module 900 (e.g., while turning off the other emitters) and measure the luminous flux $L_E$ of the light emitted by that emitter using one of the two detectors 916, 918. For example, the emitter control circuit 936 may turn on the first emitter 911 of the emitter module 910 (e.g., at the same time as turning off the other emitters 912, 913, 914 and determine the luminous flux $L_E$ of the light emitted by the first emitter 911 in response to the first optical feedback signal $V_{FB1}$ generated from the first detector 916. In addition, the emitter control circuit 936 may be configured to drive the emitters 911, 912, 913, 914 and the detectors 916, 918 to generate the emitter forward voltage feedback signals $V_{FE1}$-$V_{FE4}$ and the detector forward voltage feedback signals $V_{FD1}$, $V_{FD2}$ during the measurement intervals.

Calibration values for the various operational characteristics of the middle drone lighting module 900 may be stored in a memory as part of a calibration procedure performed during manufacturing. For example, the memory 852 of the master lighting module 800. Calibration values may be stored for each of the emitters 911, 912, 913, 914 and/or the detectors 916, 918 of the middle drone lighting module 900. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and/or y-chromaticity measurements may be obtained from the emitters 911, 912, 913, 914 using an external calibration tool, such as a spectrophotometer. In examples, the middle drone lighting module 900 may measure the values for the emitter forward voltages, photodiode currents, and/or detector forward voltages internally. An external calibration tool and/or the middle drone lighting module 900 may measure the calibration values for each of the emitters 911, 912, 913, 914 and/or the detectors 916, 918 at a plurality of different drive currents, and/or at a plurality of different operating temperatures.

After installation, a master lighting module of the lighting device (e.g., the master lighting module 800) may use the calibration values stored in memory (e.g., the memory 852) to maintain a constant light output from the middle drone lighting module 900. The emitter control circuit 936 may determine target values for the luminous flux to be emitted from the emitters 911, 912, 913, 914 to achieve the target intensity $L_{TRGT}$ and/or the target color temperature $T_{TRGT}$ for the middle drone lighting module 900. The emitter control circuit 936 may determine the magnitudes for the respective drive currents $I_{LED1}$-$I_{LED4}$ for the emitters 911, 912, 913, 914 based on the determined target values for the luminous flux to be emitted from the emitters 911, 912, 913, 914. When the age of the middle drone lighting module 900 is zero, the magnitudes of the respective drive currents $I_{LED1}$-$I_{LED4}$ for the emitters 911, 912, 913, 914 may be controlled to initial magnitudes $I_{LED\text{-}INITIAL}$.

The light output (e.g., a maximum light output and/or the light output at a specific current or frequency) of middle drone lighting module 900 may decrease as the emitters 911, 912, 913, 914 age. The emitter control circuit 936 may be configured to increase the magnitudes of the drive current IDR for the emitters 911, 912, 913, 914 to adjusted magnitudes $I_{LED\text{-}ADJUSTED}$ to achieve the determined target values for the luminous flux of the target intensity $L_{TRGT}$ and/or the target color temperature $T_{TRGT}$.

Figure 10:
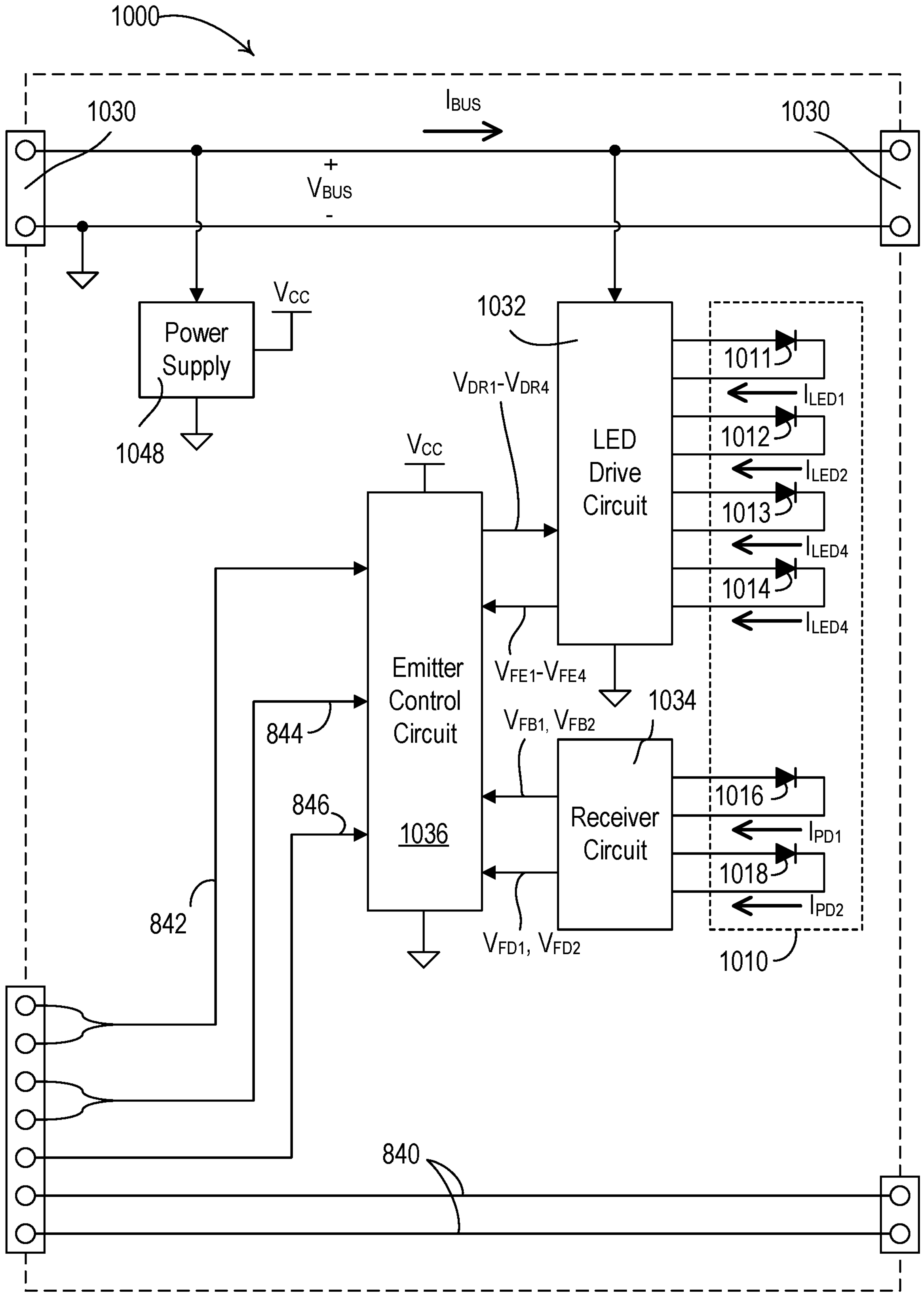
FIG. 10 is a simplified block diagram of an example end emitter module.

FIG. 10 is a simplified block diagram of an example drone lighting module 1000 (e.g., an end drone module such as end drone lighting modules 150C, 200D, and/or 200E shown in FIGS. 2, 3D, and 3E) of a lighting device (e.g., such as the lighting device 100 shown in FIGS. 1, 2 the lighting devices 400A, 400B, 400C shown in FIG. 5, and/or the lighting devices 510A, 510B shown in FIG. 6) of a lighting system (e.g., the lighting system 500 shown in FIG. 6). The end drone lighting module 1000 may be an end lighting module of the lighting device. The end drone lighting module 1000 may comprise one or more emitter modules 1010 (e.g., the emitter modules 154, 210, and/or 300 shown in FIGS. 2, 3A-3E, 4A, and 4B). The emitter module 1010 may include one or more strings of emitters 1011, 1012, 1013, 1014. Although each of the emitters 1011, 1012, 1013, 1014 is shown in FIG. 10 as a single LED, each of the emitters 1011, 1012, 1013, 1014 may comprise a plurality of LEDs connected in series (e.g., a chain of LEDs), a plurality of LEDs connected in parallel, or a suitable combination thereof, depending on the particular lighting system. In addition, each of the emitters 1011, 1012, 1013, 1014 may comprise one or more organic light-emitting diodes (OLEDs). For example, the first emitter 1011 may represent a chain of red LEDs, the second emitter 1012 may represent a chain of blue LEDs, the third emitter 1013 may represent a chain of green LEDs, and the fourth emitter 1014 may represent a chain of white or amber LEDs.

The end drone lighting module 1000 may control the emitters 1011, 1012, 1013, 1014 to adjust an intensity level (e.g., brightness or luminous flux) and/or a color (e.g., a color temperature) of a cumulative light output of the end drone lighting module 1000. The emitter module 1010 may also comprise one or more detectors 1016, 1018 (e.g. the detectors 312) that may generate respective photodiode currents $I_{PD1}$, $I_{PD2}$ (e.g., detector signals) in response to incident light. In examples, the detectors 1016, 1018 may be photodiodes. For example, the first detector 1016 may represent a single red, orange or yellow LED or multiple red, orange or yellow LEDs in parallel, and the second detector 1018 may represent a single green LED or multiple green LEDs in parallel.

The end drone lighting module 1000 may comprise a power supply 1048 that may receive a source voltage, such as a bus voltage (e.g., the bus voltage $V_{BUS}$ on the power bus 530), via a first connector 1030. The power supply 1048 may generate an internal DC supply voltage $V_{CC}$ which may be used to power one or more circuits (e.g., low voltage circuits) of the end drone lighting module 1000, such as the emitter control circuit 1036.

The end drone lighting module 1000 may comprise an LED drive circuit 1032. The LED drive circuit 1032 may be configured to control (e.g., individually controlling) the power delivered to and/or the luminous flux of the light emitted by each of the emitters 1011, 1012, 1013, 1014 of the emitter module 1010. The LED drive circuit 1032 may receive the bus voltage $V_{BUS}$ and may adjust magnitudes of respective LED drive currents $I_{LED1}$, $I_{LED2}$, $I_{LED3}$, $I_{LED4}$ conducted through the emitters 1011, 1012, 1013, 1014. The LED drive circuit 1032 may comprise one or more regulation circuits (e.g., four regulation circuits), such as switching regulators (e.g., buck converters) for controlling the magnitudes of the respective LED drive currents $I_{LED1}$-$I_{LED4}$.

The end drone lighting module 1000 may comprise a receiver circuit 1034 that may be electrically coupled to the detectors 1016, 1018 of the emitter module 1010 for generating respective optical feedback signals $V_{FB1}$, $V_{FB2}$ in response to the photodiode currents $I_{PD1}$, $I_{PD2}$. The receiver circuit 1034 may comprise one or more trans-impedance amplifiers (e.g., two trans impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The middle drone lighting module 1000 may comprise an emitter control circuit 1036 for controlling the LED drive circuit 1032 to control the intensities and/or colors of the emitters 1011, 1012, 1013, 1014 of the emitter module 1010. The emitter control circuit 1036 may comprise, for example, a microprocessor, a microcontroller, a programmable logic device (PLD), an application specific integrated circuit (ASIC), a field-programmable gate array (FPGA), or any other suitable processing device or controller. The emitted control circuit 1036 may be powered by the power supply 1048 (e.g., receiving the voltage $V_{CC}$). The emitter control circuit 1036 may generate one or more drive signals $V_{DR1}$, $V_{DR2}$, $V_{DR3}$, $V_{DR4}$ for controlling the respective regulation circuits in the LED drive circuit 1032. The emitter control circuit 1036 may receive the optical feedback signals $V_{FB1}$, $V_{FB2}$ from the receiver circuit 934 for determining the luminous flux $L_E$ of the light emitted by the emitters 1011, 1012, 1013, 1014.

The emitter control circuit 1036 may be configured to transmit an indication to the master control circuit 850 when the emitter control circuit 1036 requires service and/or has a message to transmit to the master lighting module 800 via the IRQ signal line 846 (e.g., such as the IRQ signal line 570 shown in FIG. 6). For example, the emitter control circuit 1036 may signal the master control circuit (e.g., the master control circuit 850) via the IRQ signal line 846 that the emitter control circuit 1036 needs to be serviced. In addition, the emitter control circuit 1036 may signal to the master control circuit via the IRQ signal line 846 that the emitter control circuit 1036 has a message to transmit to the master control circuit.

The emitter control circuit 1036 may receive a plurality of emitter forward voltage feedback signals $V_{FE1}$, $V_{FE2}$, $V_{FE3}$, $V_{FE4}$ from the LED drive circuit 1032 and a plurality of detector forward voltage feedback signals $V_{FD1}$, $V_{FD2}$ from the receiver circuit 1034. The emitter forward voltage feedback signals $V_{FE1}$-$V_{FE4}$ may be representative of the magnitudes of the forward voltages of the respective emitters 1011, 1012, 1013, 1014, which may indicate temperatures $T_{E1}$, $T_{E2}$, $T_{E3}$, $T_{E4}$ of the respective emitters. If each emitter 1011, 1012, 1013, 1014 comprises multiple LEDs electrically coupled in series, the emitter forward voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward voltage feedback signals $V_{FD1}$, $V_{FD2}$ may be representative of the magnitudes of the forward voltages of the respective detectors 1016, 1018, which may indicate temperatures $T_{D1}$, $T_{D2}$ of the respective detectors. For example, the detector forward voltage feedback signals $V_{FD1}$, $V_{FD2}$ may be equal to the forward voltages $V_{FD}$ of the respective detectors 1016, 1018.

The emitter control circuit 1036 of the end drone lighting module 1000 may receive messages (e.g., control messages) via a communication bus 842 (e.g., the drone communication bus 550), for example, using the $I^2C$ communication protocol. For example, the end drone lighting module 1000 may receive messages from a master lighting module (e.g., the master module 150A, 200A, 512, and/or the master lighting module 800). A master control circuit of the master lighting module (e.g., master control circuit 850) may be configured to control the end drone lighting module 1000 to control the intensity level (e.g., brightness or luminous flux) and/or the color (e.g., the color temperature) of the cumulative light emitted by the end drone lighting module 1000.

The master control circuit may be configured to adjust a present intensity level $L_{PRES}$ (e.g., a present brightness) of the cumulative light emitted by the end drone lighting module 1000 towards a target intensity level $L_{TRGT}$ (e.g., a target brightness). The target intensity level $L_{TRGT}$ may be in a range across a dimming range of the end drone lighting module 1000, e.g., between a low-end intensity level $L_{LE}$ (e.g., a minimum intensity level, such as approximately 0.1%-1.0%) and a high end intensity level $L_{HE}$ (e.g., a maximum intensity level, such as approximately 100%). The master control circuit may be configured to adjust a present color temperature $T_{PRES}$ of the cumulative light emitted by the end drone lighting module 1000 towards a target color temperature $T_{TRGT}$. The target color temperature $T_{TRGT}$ may be in a range between a cool-white color temperature (e.g., approximately 3100-4500 K) and a warm-white color temperature (e.g., approximately 2000-3000 K).

When the end drone lighting module 1000 is powered on, the master control circuit may be configured to control the end drone lighting module 1000 (e.g., the emitters of the end drone lighting module 1000) to emit light substantially all of the time. The emitter control circuit 1036 may be configured to receive a timing signal (e.g., via the timing signal lines 844 and/or an IRQ signal line 846). The emitter control circuit 1036 may use the timing signal to coordinate the timing at which the emitter control circuit 1036 can perform a measurement procedure (e.g., to reduce the likelihood that any module causes interference with the measurement procedure of another module). For example, the emitter control circuit 1036 may use the timing signal to determine a time to measure optical feedback information of the lighting loads of its module to, for example, perform color and/or intensity level control refinement, when other master and drone lighting modules are not emitting light.

The emitter control circuit 1036 may be configured to disrupt the normal emission of light to execute the measurement procedure during periodic measurement intervals. During the periodic measurement intervals, the emitter control circuit 1036 may measure one or more operational characteristics of the end drone lighting module 1000. The measurement intervals may occur based on the timing signal on the synchronization lines 844 (e.g., which may be based on zero-crossing events of the AC mains line voltage $V_{AC}$). The emitter control circuit 1036 may be configured to receive the timing signal and determine the specific timing of the periodic measurement intervals (e.g., a frequency of periodic measurement intervals) based on (e.g., in response to the timing signal. For example, during the measurement intervals, the emitter control circuit 1036 may be configured to individually turn on each of the different-colored emitters 1011, 1012, 1013, 1014 of the end drone lighting module 1000 (e.g., while turning off the other emitters) and measure the luminous flux $L_E$ of the light emitted by that emitter using one of the two detectors 1016, 1018. For example, the emitter control circuit 1036 may turn on the first emitter 1011 of the emitter module 1010 (e.g., at the same time as turning off the other emitters 1012, 1013, 1014 and determine the luminous flux $L_E$ of the light emitted by the first emitter 1011 in response to the first optical feedback signal $V_{FB1}$ generated from the first detector 1016. In addition, the emitter control circuit 1036 may be configured to drive the emitters 1011, 1012, 1013, 1014 and the detectors 1016, 1018 to generate the emitter forward voltage feedback signals $V_{FE1}$-$V_{FE4}$ and the detector forward voltage feedback signals $V_{FD1}$, $V_{FD2}$ during the measurement intervals.

Calibration values for the various operational characteristics of the end drone lighting module 1000 may be stored in a memory as part of a calibration procedure performed during manufacturing. For example, the memory 852 of the master lighting module 800. Calibration values may be stored for each of the emitters 1011, 1012, 1013, 1014 and/or the detectors 1016, 1018 of the end drone module 1000. For example, calibration values may be stored for measured values of luminous flux (e.g., in lumens), x-chromaticity, y-chromaticity, emitter forward voltage, photodiode current, and/or detector forward voltage. For example, the luminous flux, x-chromaticity, and/or y-chromaticity measurements may be obtained from the emitters 1011, 1012, 1013, 1014 using an external calibration tool, such as a spectrophotometer. In examples, the end drone lighting module 1000 may measure the values for the emitter forward voltages, photodiode currents, and/or detector forward voltages internally. An external calibration tool and/or the end drone lighting module 1000 may measure the calibration values for each of the emitters 1011, 1012, 1013, 1014 and/or the detectors 1016, 1018 at a plurality of different drive currents, and/or at a plurality of different operating temperatures.

After installation, a master lighting module of the lighting device (e.g., the master lighting module 800) may use the calibration values stored in memory (e.g., the memory 852) to maintain a constant light output from the end drone module 1000. The emitter control circuit 1036 may determine target values for the luminous flux to be emitted from the emitters 1011, 1012, 1013, 1014 to achieve the target intensity level $L_{TRGT}$ and/or the target color temperature $T_{TRGT}$ for the end drone module 1000. The emitter control circuit 1036 may determine the magnitudes for the respective drive currents $I_{LED1}$-$I_{LED4}$ for the emitters 1011, 1012, 1013, 1014 based on the determined target values for the luminous flux to be emitted from the emitters 1011, 1012, 1013, 1014. When the age of the end drone module 1000 is zero, the magnitudes of the respective drive currents $I_{LED1}$-$I_{LED4}$ for the emitters 1011, 1012, 1013, 1014 may be controlled to initial magnitudes $I_{LED\text{-}INITIAL}$.

The light output (e.g., a maximum light output and/or the light output at a specific current or frequency) of end drone module 1000 may decrease as the emitters 1011, 1012, 1013, 1014 age. The emitter control circuit 1036 may be configured to increase the magnitudes of the drive current IDR for the emitters 1011, 1012, 1013, 1014 to adjusted magnitudes $I_{LED\text{-}ADJUSTED}$ to achieve the determined target values for the luminous flux of the target intensity level $L_{TRGT}$ and/or the target color temperature $T_{TRGT}$.

Figure 11:
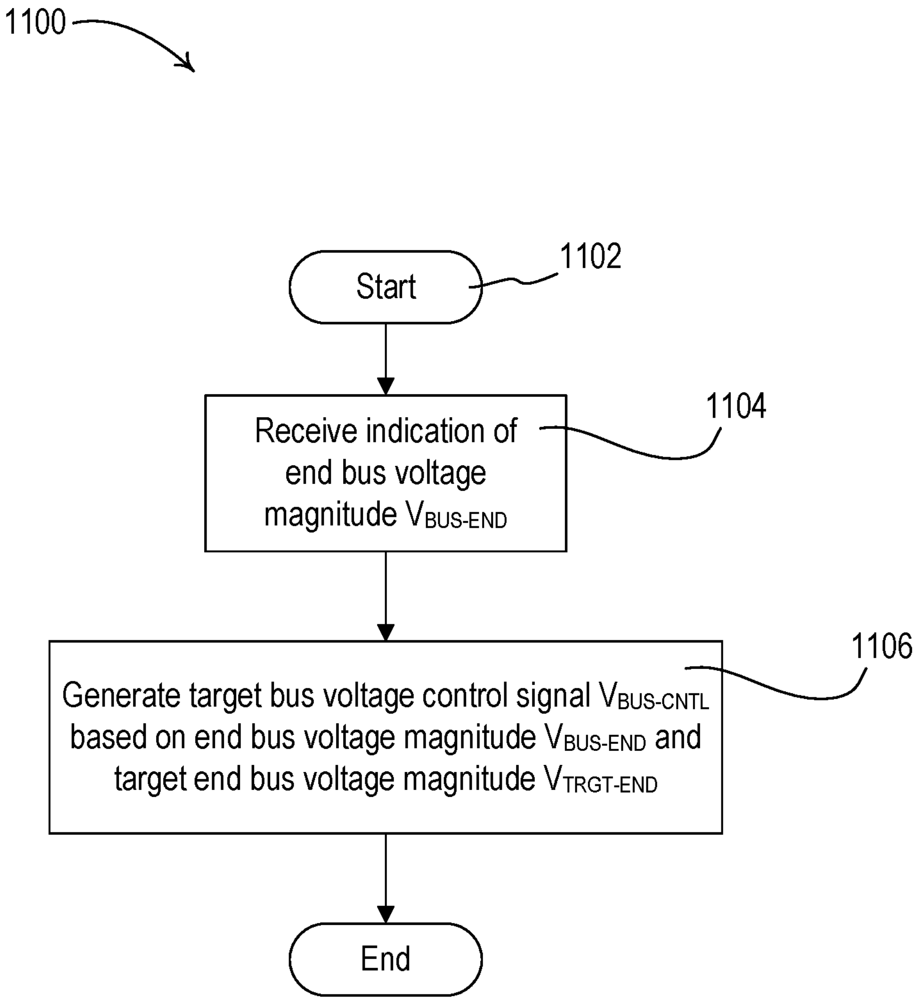
FIG. 11 is a flowchart depicting an example procedure for a fixture controller to adjust a target bus voltage magnitude for a bus voltage generated by a power converter circuit to adjust an end bus voltage magnitude of the bus voltage as received by an end master lighting module to a target end bus voltage magnitude.

FIG. 11 is a flowchart depicting an example procedure 1100 for a fixture controller to adjust (e.g., dynamically adjust) a target bus voltage magnitude $V_{TRGT}$ for a bus voltage $V_{BUS}$ generated by a power converter circuit to adjust an end bus voltage magnitude $V_{BUS-END}$ of the bus voltage $V_{BUS}$ as received by an end master lighting module to a target end bus voltage magnitude $V_{TRGT-END}$. The procedure 1100 may be executed by a control circuit of a fixture controller (e.g., the fixture control circuit 736 of the fixture controller 700). The fixture controller may be part of a lighting system (e.g., the lighting system 500) that includes one or more master lighting modules and/or one or more drone lighting modules. The control circuit may execute the procedure 1100 periodically. The control circuit may perform the procedure 1100 to control the end bus voltage magnitude $V_{BUS-END}$ to be as small as possible (e.g., independent of the length of the wiring of the power bus) to, for example, increase the efficiency of the lighting system (e.g., as described herein).

The procedure 1100 may start at 1102. At 1104, the control circuit may receive an indication of the end bus voltage magnitude $V_{BUS-END}$ at the end master lighting module. The end master lighting module may be master lighting module that is located furthest from the fixture controller along the power bus. For instance, the lighting system may include a plurality of master lighting modules and a plurality of drone lighting modules, where the master lighting modules and drone lighting modules are serially-coupled on the power bus. The end master lighting module may be the master lighting module that is coupled on the power bus furthest from the fixture controller. In some examples, the control circuit may receive the indication of the end bus voltage magnitude $V_{BUS-END}$ at the end master lighting module in one or more messages received from the end master lighting module via the serial communication circuit over the communication bus.

For example, as described herein, the fixture controller and/or the master lighting modules may be configured to determine which master lighting module coupled to the power bus is the end master lighting module based on bus voltage measurements performed by the master lighting modules. For example, the fixture controller may send a query message to the master lighting modules coupled to the power bus, and in response, the master lighting modules may send a bus voltage measurement to the fixture controller. The fixture controller may determine that the end master lighting module is the master lighting module that reports the lowest bus voltage measurement (e.g., the end bus voltage magnitude $V_{BUS-END}$). In such examples, the fixture controller may send a query message to the end lighting module (e.g., only the end lighting module) prior to 1104.

Alternatively or additionally, the master lighting modules may send (e.g., automatically and/or periodically send) the bus voltage measurement to the fixture controller (e.g., without first receiving a query message from the fixture controller). The master lighting modules (e.g., each master lighting module) may receive the respective measurements of the bus voltage from the other master lighting modules, and the master lighting modules that has the lower bus voltage measurement may configured itself as the end master lighting module. In such examples, the end lighting module may send (e.g., periodically send) its bus voltage measurement (e.g., the end bus voltage magnitude $V_{BUS-END}$) to the fixture controller (e.g., before 1104 and without the fixture controller transmitting a query message).

At 1106, the control circuit may be configured to generate the target bus voltage control signal $V_{BUS-CNTL}$ based on the magnitude of the end bus voltage $V_{BUS-END}$ and the target end bus voltage magnitude. For example, the control circuit may be configured to generate the target bus voltage control signal $V_{BUS-CNTL}$ to indicate a target bus voltage magnitude $V_{TRGT}$ that may cause the end bus voltage magnitude $V_{BUS-END}$ to be adjusted towards the target end bus voltage magnitude $V_{TRGT-END}$. The target end bus voltage magnitude $V_{TRGT-END}$ may be a constant voltage, such as approximately 17 V. In some examples, the control circuit may be configured to generate the target bus voltage control signal $V_{BUS-CNTL}$ based on the end bus voltage magnitude $V_{BUS-END}$ and the target end bus voltage magnitude $V_{TRGT-END}$ using a digital proportional-integral (PI) controller. For example, the PI controller may be configured to generate an error value based on the end bus voltage magnitude $V_{BUS-END}$ and the target end bus voltage magnitude $V_{TRGT-END}$, and generate the target bus voltage control signal $V_{BUS-CNTL}$ based on the error value. The power converter circuit may receive the target bus voltage control signal $V_{BUS-CNTL}$ and may control the magnitude of the bus voltage $V_{BUS}$ generated on the power bus towards the target bus voltage magnitude $V_{TRGT}$ (e.g., which may be based on the target bus voltage control signal $V_{BUS-CNTL}$). Accordingly, the fixture controller may adjust (e.g., dynamically adjust) the target bus voltage magnitude $V_{TRGT}$ for generating the bus voltage $V_{BUS}$ generated by the power converter circuit to adjust the end bus voltage magnitude $V_{BUS-END}$ of the bus voltage $V_{BUS}$ across the power bus at the end master module to the target end bus voltage magnitude $V_{TRGT-END}$ to, for example, increase the efficiency of the lighting system.

Figure 12:
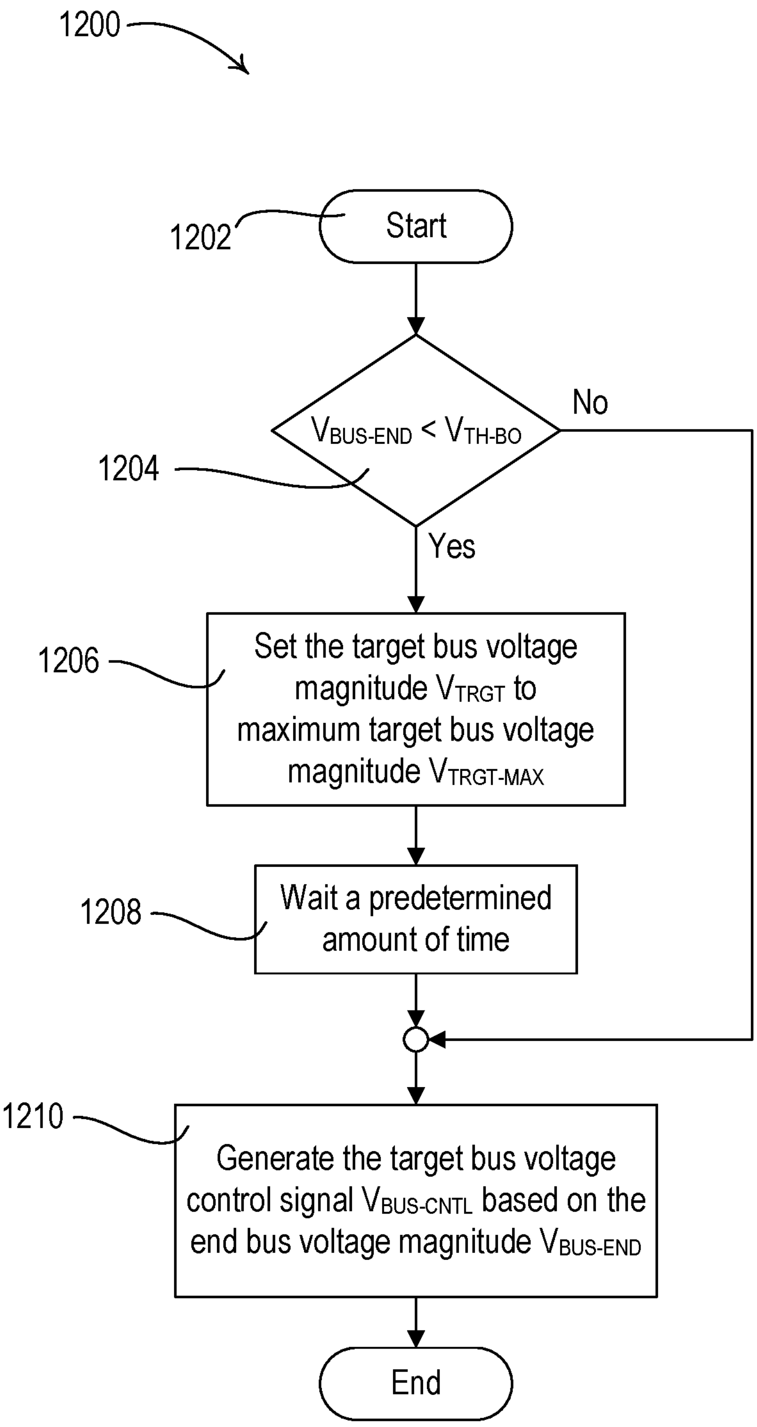
FIG. 12 is a flowchart depicting an example procedure for a fixture controller to prevent the occurrence of a brownout event on the power bus using a pre-brownout threshold.

FIG. 12 is a flowchart depicting an example procedure 1200 for a fixture controller to prevent the occurrence of a brownout event on the power bus using a pre-brownout threshold $V_{TH-BO}$. The procedure 1200 may be executed by a control circuit of a fixture controller (e.g., the fixture control circuit 736 of the fixture controller 700). The fixture controller may be part of a lighting system (e.g., the lighting system 500) that includes one or more master lighting modules and/or one or more drone lighting modules. The control circuit may execute the procedure 1200 periodically. In some examples, the control circuit may execute the procedure 1200 of FIG. 12 along with the procedure 1100 of FIG. 11. Controlling the end bus voltage magnitude $V_{BUS-END}$ towards a target end bus voltage magnitude $V_{TRGT-END}$ that is selected to maximum efficiency of the lighting system across a variety of different power bus wiring topologies could lead to instances where the end master lighting module experiences a brownout event (e.g., due to the end bus voltage $V_{BUS-END}$ dropping too low, such as when the lighting modules are fading on or off). Accordingly, the control circuit may perform the procedure 1200 to prevent a brownout event from occurring.

The procedure 1200 may start at 1202. At 1204, the control circuit may determine whether the end bus voltage magnitude $V_{BUS-END}$ is below the pre-brownout threshold $V_{TH-BO}$. As noted herein, the end master lighting module may be a master lighting module that has the longest amount of power bus wiring between the master lighting module and the fixture controller. Further, as also noted herein, the control circuit may receive an indication of the end bus voltage magnitude $V_{BUS-END}$ from the end master lighting module in one or more messages received via the serial communication circuit over the communication bus. If the control circuit determines that the end bus voltage magnitude $V_{BUS-END}$ is not below the pre-brownout threshold $V_{TH-BO}$, the control circuit may generate a target bus voltage control signal $V_{BUS\text{-}CNTL}$ based on the end bus voltage magnitude $V_{BUS\text{-}END}$, and the procedure 1200 may exit.

If the control circuit determines that the end bus voltage magnitude $V_{BUS}$-END is below the pre-brownout threshold $V_{TH\text{-}BO}$ at 1204, the control circuit may set the target bus voltage magnitude $V_{TRGT}$ to a maximum target bus voltage magnitude $V_{TRGT\text{-}MAX}$ at 1206. For example, the control circuit may control the target bus voltage control signal $V_{BUS\text{-}CNTL}$ to cause the target bus voltage magnitude $V_{TRGT}$ be equal to the maximum target bus voltage magnitude $V_{TRGT\text{-}MAX}$ to cause a power converter circuit of the fixture controller to control the magnitude of the bus voltage $V_{BUS}$ towards the maximum target bus voltage magnitude $V_{TRGT\text{-}MAX}$ (e.g., approximately 21 V). As noted herein, the target bus voltage magnitude $V_{TRGT}$ may range from a minimum target bus voltage magnitude $V_{TRGT\text{-}MIN}$ to the maximum target bus voltage magnitude $V_{TRGT\text{-}MAX}$. The target bus voltage control signal $V_{BUS\text{-}CNTL}$ may cause the power converter circuit to control the magnitude of the bus voltage $V_{BUS}$ towards the target bus voltage magnitude $V_{TRGT}$ that may range between the minimum target bus voltage magnitude $V_{TRGT\text{-}MIN}$ (e.g., approximately 17 V) to the maximum target bus voltage magnitude $V_{TRGT\text{-}MAX}$ (e.g., approximately 21 V). The pre-brownout threshold $V_{TH\text{-}BO}$ may be below the minimum target bus voltage magnitude $V_{TRGT\text{-}MIN}$.

At 1208, the control circuit may wait a predetermined amount of time. For example, control circuit may generate the target bus voltage control signal $V_{BUS\text{-}CNTL}$ to adjust the target bus voltage magnitude $V_{TRGT}$ to the maximum target bus voltage magnitude $V_{TRGT\text{-}MAX}$ for a predetermined period of time (e.g., approximately 3 seconds). The predetermined period of time may allow for the generated bus voltage magnitude $V_{BUS\text{-}GEN}$ of the bus voltage $V_{BUS}$ to stabilize and/or increase to the target end bus voltage magnitude $V_{TRGT\text{-}END}$ (e.g., above the pre-brownout threshold). For example, by waiting the predetermined period of time, the control circuit may allow for the end bus voltage magnitude $V_{BUS\text{-}END}$ to rise above the pre-brownout threshold $V_{TH\text{-}BO}$ (e.g., which may occur after the lighting modules have completed their fade on or off).

At the expiration of the predetermined period of time, the fixture control circuit 736 may be configured to generate the target bus voltage control signal $V_{BUS\text{-}CNTL}$ based on the end bus voltage magnitude $V_{BUS\text{-}END}$ at 1210. For example, at the expiration of the predetermined period of time, the control circuit may be configured to generate the target bus voltage control signal $V_{BUS\text{-}CNTL}$ to adjust the target bus voltage magnitude $V_{TRGT}$ to be less than the maximum target bus voltage magnitude $V_{TRGT\text{-}MAX}$. Accordingly, the fixture controller may perform the procedure 1200 to prevent the occurrence of a brownout event on the power bus using the pre-brownout threshold $V_{TH\text{-}BO}$.

Alternatively, the control circuit may generate the target bus voltage control signal $V_{BUS\text{-}CNTL}$ to adjust the target bus voltage magnitude $V_{TRGT}$ to the maximum target bus voltage magnitude $V_{TRGT\text{-}MAX}$ until the bus voltage $V_{BUS}$ stabilizes (e.g., instead of waiting the predetermined amount of time at 1208). For example, the control circuit may monitor the magnitude of the bus voltage $V_{BUS}$ to determine when the bus voltage $V_{BUS}$ stabilizes, and in response to a determination that the bus voltage $V_{BUS}$ has stabilized, the control circuit may generate the target bus voltage control signal $V_{BUS\text{-}CNTL}$ based on the end bus voltage magnitude $V_{BUS\text{-}END}$ (e.g., at 1210).

What is claimed is:

1. A system comprising:

a plurality of lighting devices, wherein each lighting device is configured to adjust a present intensity level of light emitted by the lighting device between a low-end intensity level and a high-end intensity level; and a fixture controller comprising:

a power converter circuit configured to generate a bus voltage on a power bus, wherein the power bus is coupled between the fixture controller and the plurality of lighting devices, and wherein the plurality of lighting devices are serially-coupled on the power bus; and a control circuit configured to control the one or more lighting devices, the control circuit configured to:

receive an indication of an end bus voltage magnitude, wherein the end bus voltage magnitude is a magnitude of the bus voltage as received by an end lighting device of the plurality of lighting devices, and wherein the end lighting device is the lighting device of the plurality of lighting devices that is located furthest from the fixture controller along the power bus; and generate a target bus voltage control signal based on the end bus voltage magnitude, wherein the target bus voltage control signal indicates a target bus voltage magnitude for the power converter circuit;

wherein the power converter circuit is configured to control a magnitude of the bus voltage towards the target bus voltage magnitude based on the target bus voltage control signal.

2. The system of claim 1, wherein the control circuit is configured to:

send a request to the end lighting device, wherein the request prompts the end lighting device to send the indication of the end bus voltage magnitude.

3. The system of claim 1, wherein the target bus voltage magnitude ranges from a minimum target bus voltage magnitude to a maximum target bus voltage magnitude; and wherein the control circuit is configured to:

determine that the end bus voltage magnitude drops below a pre-brownout threshold; and generate the target bus voltage control signal to control the target bus voltage magnitude to be equal to the maximum target bus voltage magnitude in response to the determination that the end bus voltage magnitude has dropped below the pre-brownout threshold.

4. The system of claim 3, wherein the control circuit is configured to generate the target bus voltage control signal to control the target bus voltage magnitude to be equal to the maximum target bus voltage magnitude for a predetermined period of time; and wherein, at an expiration of the predetermined period of time, the control circuit is configured to generate the target bus voltage control signal based on the end bus voltage magnitude.

5. The system of claim 4, wherein, at the expiration of the predetermined period of time, the control circuit is configured to generate the target bus voltage control signal at a value that is less than the maximum value.

6. The system of claim 3, wherein the magnitude of the pre-brownout threshold is below the minimum target bus voltage magnitude.

7. The system of claim 6, wherein the minimum target bus voltage magnitude is approximately 17 volts and the maximum target bus voltage magnitude is approximately 21 volts.

8. The system of claim 1, wherein the control circuit is configured to control the magnitude of the target bus voltage control signal to control the end bus voltage magnitude towards a target end bus voltage magnitude.

9. The system of claim 8, wherein the control circuit is configured to generate the target bus voltage control signal based on the end bus voltage magnitude and the target end bus voltage magnitude.

10. The system of claim 8, wherein the control circuit comprises a digital proportional-integral (PI) controller, and the PI controller is configured to generate an error value based on the end bus voltage magnitude and the target end bus voltage magnitude, and generate the target bus voltage control signal based on error value.

11. The system of claim 8, wherein the power converter circuit is configured to generate the bus voltage based on a feedback signal that indicates a magnitude of the bus voltage generated by the power converter circuit and the target bus voltage control signal.

12. The system of claim 8, wherein the control circuit is configured to generate the target bus voltage control signal to cause the power converter circuit to generate the bus voltage at a magnitude across a range between a minimum bus voltage and a maximum bus voltage, and wherein the target end bus voltage magnitude is equal to the minimum bus voltage.

13. The system of claim 1, wherein each of the plurality of lighting devices comprises one or more master lighting modules and one or more drone lighting modules; and wherein the control circuit of the fixture controller is configured to transmit one or more messages to the master lighting modules via a master communication bus, and wherein the master lighting modules of each lighting device are configured to relay the messages to the one or more drone lighting modules of the lighting device; and wherein the control circuit is configured to receive the indication of the end bus voltage magnitude at an end master lighting module of the end lighting device, wherein the end master lighting module is located furthest from the fixture controller along the power bus.

14. The system of claim 1, wherein the end lighting device is a lighting device of the plurality of lighting devices that has the longest amount of power bus wiring between the fixture controller and the lighting device.

15. The system of claim 1, wherein the control circuit is configured to:

send a query message to the plurality of lighting devices, wherein the query message indicates that each of the plurality of lighting devices is to send a bus voltage measurement to the fixture controller; and determine which lighting device of the plurality of lighting devices is an end lighting device based on the respective bus voltage measurements received from the plurality of lighting devices.

16. A system comprising:

a plurality of master lighting modules, wherein each of the master lighting modules is configured to adjust a present intensity level of light emitted by one or more emitters of the respective master lighting module; and a fixture controller comprising:

a power converter circuit configured to generate a bus voltage on a power bus, wherein the power bus is coupled between the fixture controller and the plurality of master lighting modules, and wherein the plurality of master lighting modules is serially-coupled on the power bus; and a control circuit configured to:

receive an indication of an end bus voltage magnitude, wherein the end bus voltage magnitude is the magnitude of the bus voltage as received by an end master lighting module, and wherein the end master lighting module is the master lighting module of the plurality of master lighting modules that is located furthest from the fixture controller along the power bus; and generate a target bus voltage control signal based on the end bus voltage magnitude, wherein the target bus voltage control signal indicates a target bus voltage magnitude for the power converter circuit;

wherein the power converter circuit is configured to control a magnitude of the bus voltage towards the target bus voltage magnitude based on the target bus voltage control signal.

17. The system of claim 16, wherein the control circuit of the fixture controller is configured to send and receive messages with each master lighting module of the plurality of master lighting modules, and wherein each master lighting module is configured to transmit the messages to at least one drone lighting module.

18. The system of claim 16, wherein the target bus voltage magnitude ranges from a minimum target bus voltage magnitude to a maximum target bus voltage magnitude; and wherein the control circuit is configured to:

determine that the end bus voltage magnitude drops below a pre-brownout threshold; and generate the target bus voltage control signal to control the target bus voltage magnitude to be equal to the maximum target bus voltage magnitude in response to the determination that the end bus voltage magnitude has dropped below the pre-brownout threshold.

19. The system of claim 16, wherein the control circuit is configured to generate the target bus voltage control signal to cause the power converter circuit to generate the bus voltage at a magnitude across a range between a minimum bus voltage and a maximum bus voltage, and wherein the target bus voltage magnitude is equal to the minimum bus voltage.

20. The system of claim 16, wherein the control circuit is configured to:

send a query message to the plurality of master lighting modules, wherein the query message indicates that each of the plurality of master lighting modules is to send a bus voltage measurement to the fixture controller; and determine which master lighting module of the plurality of master lighting modules is an end master lighting module based on the respective bus voltage measurements received from the plurality of master lighting modules.

* * * * *